US008647105B2

(12) United States Patent
Awofeso et al.

(10) Patent No.: US 8,647,105 B2
(45) Date of Patent: Feb. 11, 2014

(54) EMBOSSING SYSTEM AND PRODUCT MADE THEREBY WITH BOTH PERFORATE BOSSES IN THE CROSS MACHINE DIRECTION AND A MACRO PATTERN

(75) Inventors: Anthony O. Awofeso, Appleton, WI (US); Kang C. Yeh, Neenah, WI (US); Bruce W. Janda, Neenah, WI (US); Martin A. Hynnek, Appleton, WI (US); Gayln A. Schulz, Greenville, WI (US); Paul J. Ruthven, Neenah, WI (US); Ronald R. Reeb, DePere, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 0 days.

(21) Appl. No.: 13/448,092

(22) Filed: Apr. 16, 2012

(65) Prior Publication Data

US 2012/0213879 A1 Aug. 23, 2012

Related U.S. Application Data

(62) Division of application No. 11/002,801, filed on Dec. 3, 2004, now Pat. No. 8,178,025.

(51) Int. Cl.
*B29C 59/04* (2006.01)

(52) U.S. Cl.
USPC .......................................................... 425/363

(58) Field of Classification Search
USPC ............. 425/363, 194; 101/32, 23, 6; 492/30; 164/114, 286; 156/196, 209; 264/132, 264/284, 119; 162/114, 286
See application file for complete search history.

(56) References Cited

U.S. PATENT DOCUMENTS

| | | | |
|---|---|---|---|
| D34,028 | S | 2/1901 | Ault |
| 673,041 | A | 4/1901 | Ault |
| 1,224,650 | A | 5/1917 | Kitchen |

(Continued)

FOREIGN PATENT DOCUMENTS

| | | | |
|---|---|---|---|
| CA | 2053505 | A1 | 4/1992 |
| EP | 1 356 923 | A1 | 10/2003 |
| WO | WO 01/48314 | A2 | 7/2001 |
| WO | WO 03050353 | A2 * | 6/2003 |

OTHER PUBLICATIONS

European Search Report dated Aug. 8, 2003, for Application No. EP 02 25 8801.

(Continued)

*Primary Examiner* — Joseph S Del Sole
*Assistant Examiner* — Lawrence D Hohenbrink, Jr.
(74) *Attorney, Agent, or Firm* — Laura L. Bozek

(57) ABSTRACT

An embossing system is provided for embossing at least a portion of a web comprising a first roll and at least a second roll. The first roll and second roll may define a first nip for embossing the web. At least one of the first roll and the second roll has elongated embossing elements extending substantially in the machine direction and optionally at least one of the first and second rolls has elongated embossing elements extending substantially in the cross-machine direction. At least one of the first roll and the second roll may also have perforate embossing elements extending substantially in the cross-machine direction that may or may not be elongated. The embossing elements are capable of imparting one or both of a cube embossing pattern or a perforate emboss on the web. In addition, the web may be creped with an undulatory creping blade.

1 Claim, 35 Drawing Sheets

(56) References Cited

U.S. PATENT DOCUMENTS 1,284,517 A 11/1918 Whitney
1,384,515 A 7/1921 Conradson
2,771,363 A 11/1956 Fish
2,803,188 A 8/1957 Duvall
2,878,553 A 3/1959 Hirsch
3,247,785 A 4/1966 Shultz
3,301,746 A 1/1967 Sanford et al.
3,337,388 A 8/1967 Wosaba, II
3,432,936 A 3/1969 Cole et al.
3,545,705 A 12/1970 Hodgson
3,549,742 A 12/1970 Benz
RE27,201 E 10/1971 Mittman
RE27,453 E 8/1972 Schutte et al.
3,709,077 A 1/1973 Trogan et al.
3,858,623 A 1/1975 Lefkowitz
3,905,863 A 9/1975 Ayers
3,940,529 A 2/1976 Hepford et al.
3,974,025 A 8/1976 Ayers
3,994,771 A 11/1976 Morgan, Jr. et al.
4,041,989 A 8/1977 Johansson et al.
4,071,050 A 1/1978 Codorniu
4,102,737 A 7/1978 Morton
4,112,982 A 9/1978 Bugge et al.
4,125,659 A 11/1978 Klowak et al.
4,127,637 A 11/1978 Pietreniak et al.
4,149,571 A 4/1979 Burroughs
4,157,276 A 6/1979 Wandel et al.
4,161,195 A 7/1979 Khan
4,182,381 A 1/1980 Gisbourne
4,184,519 A 1/1980 McDonald et al.
4,254,947 A 3/1981 Trogan
4,270,744 A 6/1981 Trogan
4,280,978 A * 7/1981 Dannheim et al. ............ 264/156
4,314,589 A 2/1982 Buchanan et al.
4,325,768 A 4/1982 Schulz
4,326,002 A 4/1982 Schulz
4,359,069 A 11/1982 Hahn
4,376,455 A 3/1983 Hahn
4,379,735 A 4/1983 MacBean
4,453,573 A 6/1984 Thompson
4,475,730 A 10/1984 Trogan
4,529,480 A 7/1985 Trokhan
4,543,156 A 9/1985 Cheshire et al.
4,564,052 A 1/1986 Borel
4,592,395 A 6/1986 Borel
4,605,585 A 8/1986 Johansson
4,611,639 A 9/1986 Bugge
4,640,741 A 2/1987 Tsuneo
4,671,983 A 6/1987 Burt
4,709,732 A 12/1987 Kinnunen
4,751,807 A 6/1988 Couturier
4,759,391 A 7/1988 Waldvogel et al.
4,759,967 A 7/1988 Bauernfeind
4,759,976 A 7/1988 Dutt
4,765,604 A 8/1988 Trogan
4,770,402 A 9/1988 Couturier
4,778,441 A 10/1988 Couturier
4,859,519 A 8/1989 Cabe, Jr. et al.
4,874,158 A 10/1989 Retzloff
4,917,665 A 4/1990 Couturier
4,942,077 A 7/1990 Wendt et al.
4,967,085 A 10/1990 Bryan et al.
4,997,338 A 3/1991 Couturier
4,998,568 A 3/1991 Vohringer
4,999,235 A 3/1991 Lunn et al.
5,016,678 A 5/1991 Borel et al.
5,030,500 A 7/1991 Perdelwitz, Jr. et al.
5,054,525 A 10/1991 Vohringer
5,066,532 A 11/1991 Gaisser
5,085,914 A 2/1992 Perdelwitz, Jr. et al.
5,098,519 A 3/1992 Ramasubramanian et al.
5,103,874 A 4/1992 Lee
5,114,777 A 5/1992 Gaisser
5,167,261 A 12/1992 Lee
5,199,261 A 4/1993 Baker
5,199,467 A 4/1993 Lee
5,211,815 A 5/1993 Ramasubramanian et al.
5,219,004 A 6/1993 Chiu
5,245,025 A 9/1993 Trokhan et al.
D341,944 S 12/1993 Peter
5,277,761 A 1/1994 Van Phan et al.
5,299,793 A 4/1994 Couturier
5,300,347 A * 4/1994 Underhill et al. ............. 428/171
5,328,565 A 7/1994 Rasch et al.
5,379,808 A 1/1995 Chiu
5,383,778 A * 1/1995 Schulz .......................... 425/363
5,490,902 A 2/1996 Schulz
5,510,002 A 4/1996 Hermans et al.
5,543,202 A 8/1996 Clark et al.
5,549,790 A 8/1996 Van Phan
5,556,509 A 9/1996 Trokhan et al.
5,562,805 A 10/1996 Kamps et al.
5,565,151 A * 10/1996 Nilsen ............................ 264/1.1
D375,844 S 11/1996 Edwards et al.
5,584,443 A 12/1996 Butterworth
5,607,551 A 3/1997 Farrington, Jr. et al.
5,622,734 A 4/1997 Clark et al.
5,643,398 A 7/1997 Lumberg
5,656,132 A 8/1997 Farrington, Jr. et al.
5,690,788 A 11/1997 Marinack et al.
5,698,291 A 12/1997 Clark et al.
5,702,571 A 12/1997 Kamps et al.
5,704,101 A 1/1998 Majors et al.
5,755,146 A 5/1998 Lumberg
5,772,149 A 6/1998 Butterworth
5,772,845 A 6/1998 Farrington, Jr. et al.
5,776,306 A 7/1998 Hepford
5,776,312 A 7/1998 Trokhan et al.
5,814,190 A 9/1998 Van Phan
5,820,064 A 10/1998 Butterworth
5,837,103 A 11/1998 Trokhan et al.
5,851,353 A 12/1998 Fiscus et al.
5,861,081 A 1/1999 Bredendick et al.
5,865,955 A 2/1999 Ilvespaa et al.
5,891,309 A 4/1999 Page et al.
5,913,765 A 6/1999 Burgess et al.
5,932,068 A 8/1999 Farrington, Jr. et al.
5,941,144 A 8/1999 Lumberg
5,968,590 A 10/1999 Ahonen et al.
6,000,657 A 12/1999 Butterworth
6,001,421 A 12/1999 Ahonen et al.
6,007,468 A 12/1999 Giacometti
6,051,095 A 4/2000 Butterworth
6,054,202 A 4/2000 Takeuchi et al.
6,074,527 A 6/2000 Hsu et al.
6,080,276 A 6/2000 Burgess
6,136,041 A 10/2000 Jaschinski et al.
6,138,543 A 10/2000 Couturier et al.
6,146,496 A 11/2000 Phan
6,149,768 A 11/2000 Hepford
6,162,961 A 12/2000 Tanner et al.
D436,738 S 1/2001 Bredendick et al.
6,200,419 B1 3/2001 Phan
6,226,611 B1 5/2001 Neumeyer et al.
6,227,086 B1 5/2001 Lumberg
6,254,522 B1 7/2001 Schmidt
6,254,725 B1 7/2001 Lau et al.
6,287,422 B1 9/2001 Harper et al.
6,296,601 B1 10/2001 Couturier
6,322,315 B1 11/2001 Schmidt et al.
6,348,131 B1 2/2002 Kershaw et al.
6,361,601 B1 * 3/2002 Schulz ............................ 118/70
6,372,064 B1 4/2002 Butterworth et al.
6,383,958 B1 5/2002 Swanson et al.
6,413,368 B1 7/2002 Dwiggins et al.
6,431,038 B2 8/2002 Couturier
6,432,267 B1 8/2002 Watson
6,432,527 B1 8/2002 Perez et al.
6,488,194 B1 12/2002 Couturier
6,508,153 B1 1/2003 Lumberg et al.
6,539,829 B1 4/2003 Kauppila et al.
6,547,909 B1 4/2003 Butterworth
6,715,411 B1 4/2004 Boegli
6,733,626 B2 5/2004 Ruthven et al.

(56) References Cited

U.S. PATENT DOCUMENTS

| | | | | |
|---|---|---|---|---|
| 6,887,349 | B2 | 5/2005 | Ruthven | |
| 7,182,838 | B2 | 2/2007 | Ruthven | |
| 7,326,322 | B2 | 2/2008 | Ruthven | |
| 7,622,020 | B2 | 11/2009 | Awofeso | |
| 2003/0138597 | A1* | 7/2003 | Ruthven et al. | 428/131 |
| 2003/0159600 | A1 | 8/2003 | Ruthven et al. | |
| 2003/0196772 | A1 | 10/2003 | Awofeso et al. | |
| 2004/0180178 | A1 | 9/2004 | Ruthven et al. | |
| 2005/0034828 | A1* | 2/2005 | Graff et al. | 162/123 |

OTHER PUBLICATIONS

Smook, G. A., Handbook for Pulp and Paper Technologists, p. 339 (1992).

European Search Report dated Apr. 21, 2006 for EP Application No. 05 02 6490.

Office Action dated Apr. 14, 2008, from parent U.S. Appl. No. 11/003,801.

Office Action dated Aug. 5, 2008, from parent U.S. Appl. No. 11/003,801.

Office Action dated Mar. 30, 2009, from parent U.S. Appl. No. 11/003,801.

Office Action dated Nov. 24, 2009, from parent U.S. Appl. No. 11/003,801.

Office Action dated May 11, 2010, from parent U.S. Appl. No. 11/003,801.

Office Action dated Feb. 14, 2011, from parent U.S. Appl. No. 11/003,801.

Office Action dated Jul. 21, 2011, from parent U.S. Appl. No. 11/003,801.

* cited by examiner

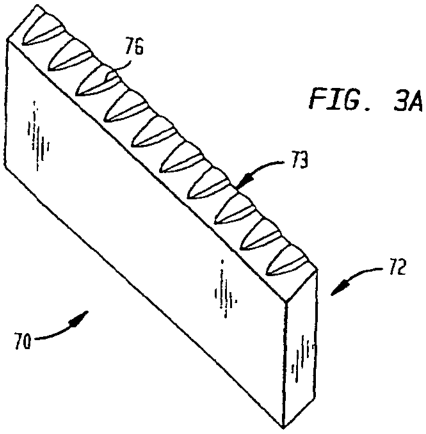
FIG. 3A
FIG. 3B
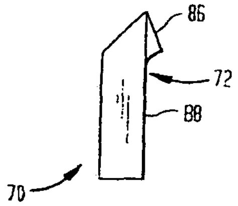
FIG. 3C
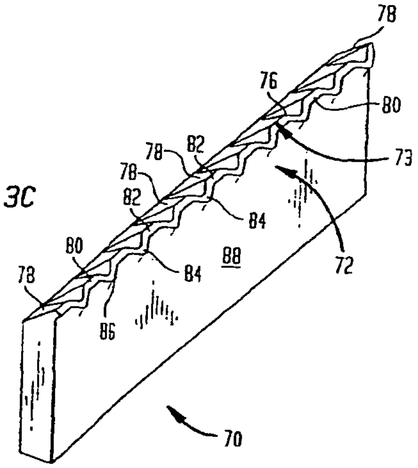
FIG. 3D
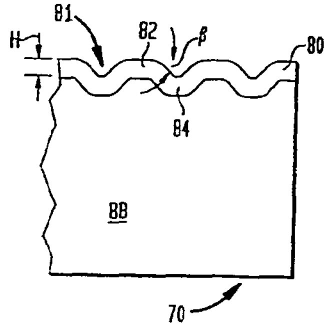

Drape Angle Measurement Tester

0% DCTMP

40% DCTMP

Mag :x400
Acc.V :20kV
Signal :SEI
WD :18mm
Spot size :30
Pressure : μ
--------------:50 m Mag :x400
Acc.V :20kV
Signal :SEI
WD :20mm
Spot size :30
Pressure : μ
--------------:50 m FIGURE 18A
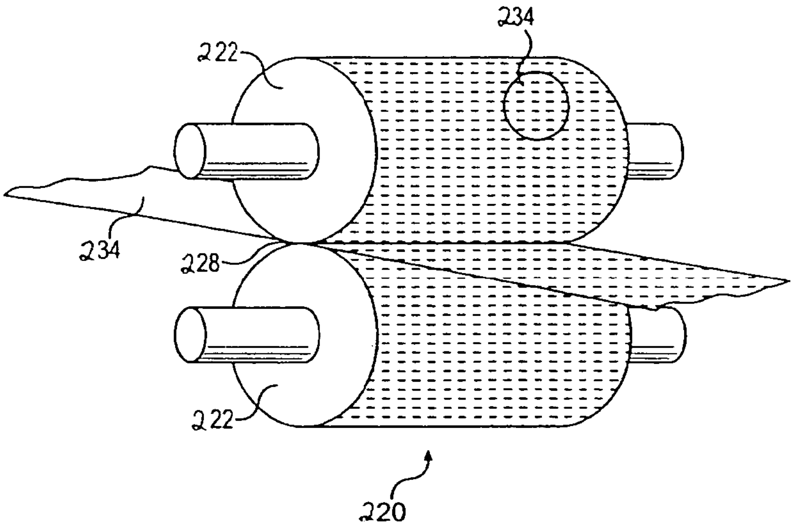
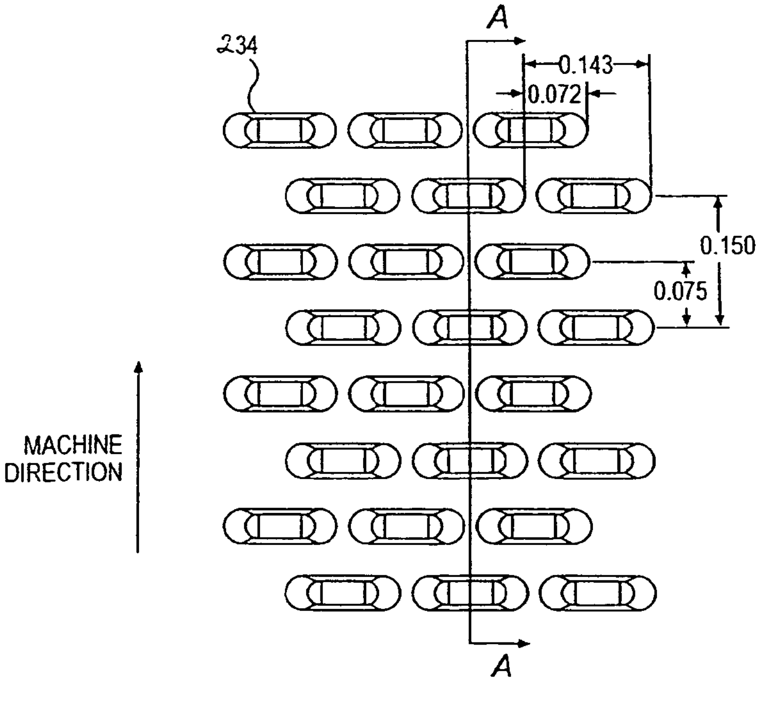
FIGURE 18B FIGURE 18C
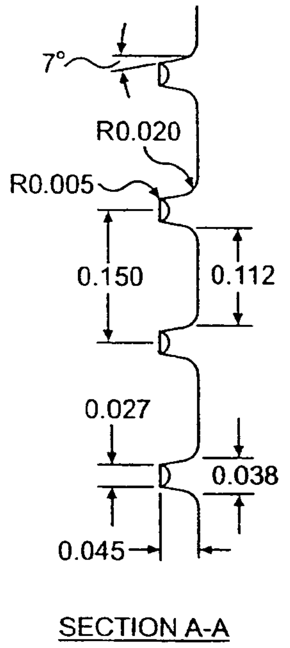
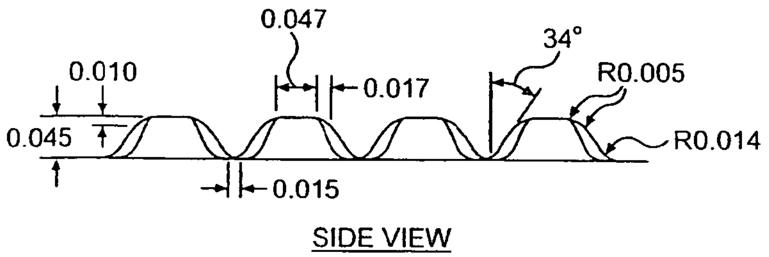
FIGURE 18D FIGURE 19
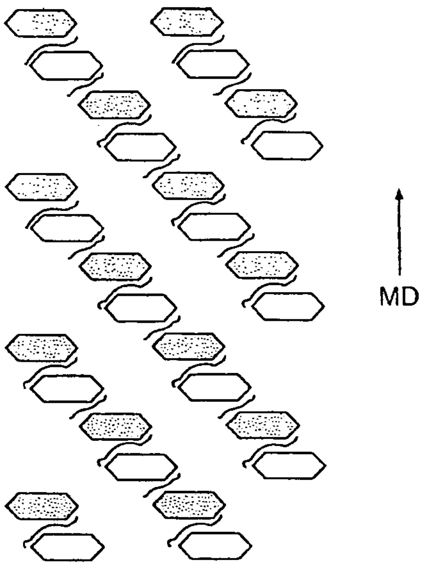
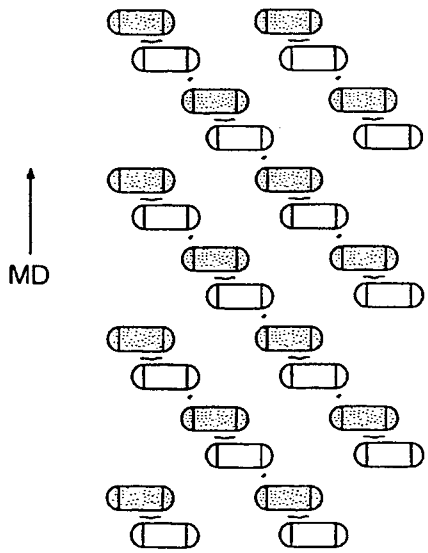
FIGURE 20

AT .032 ENGAGEMENT

7° WALL ANGLE CENTERED ALIGNMENT

9° WALL ANGLE CENTERED ALIGNMENT

11° WALL ANGLE CENTERED ALIGNMENT

AT .028 ENGAGEMENT

7° WALL ANGLE CENTERED ALIGNMENT

9° WALL ANGLE CENTERED ALIGNMENT

11° WALL ANGLE CENTERED ALIGNMENT

AT .024ENGAGEMENT

7° WALL ANGLE CENTERED ALIGNMENT

9° WALL ANGLE CENTERED ALIGNMENT

11° WALL ANGLE CENTERED ALIGNMENT

FIGURE 24
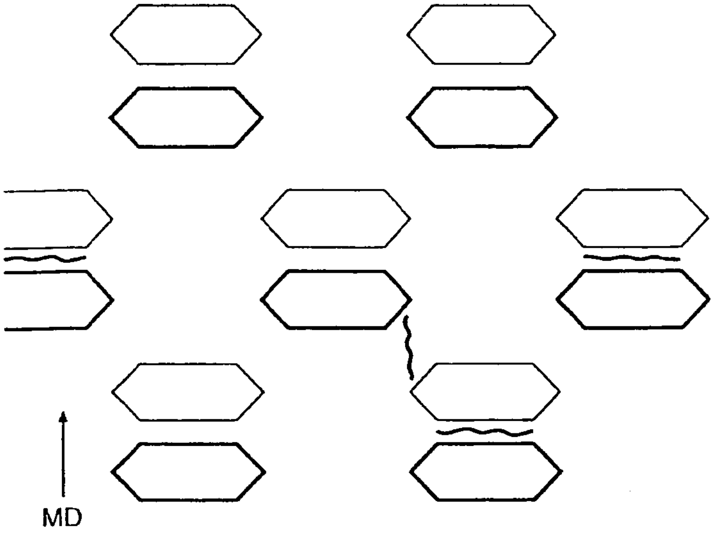
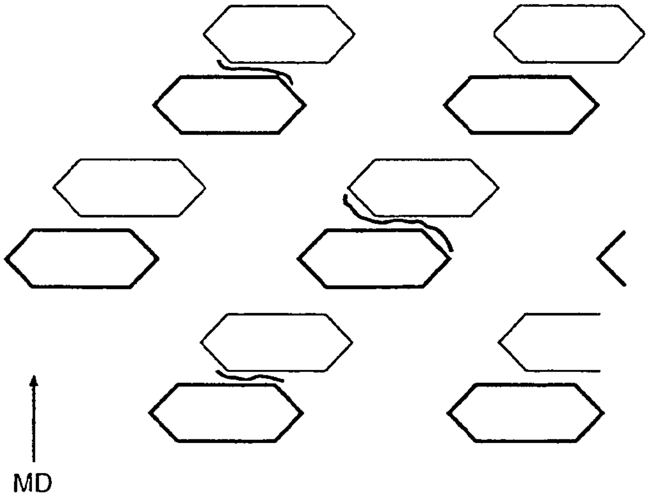
FIGURE 25

FIGURE 26
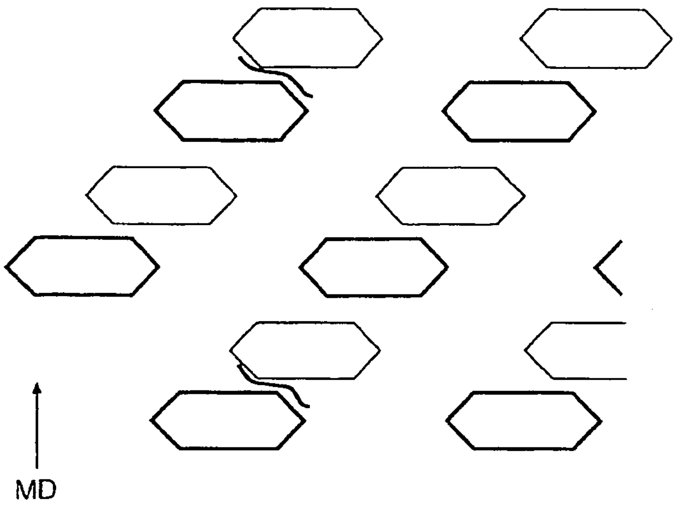
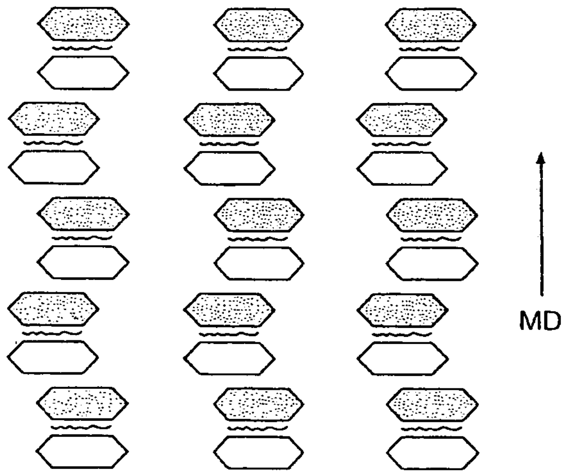
FIGURE 27

FIGURE 28
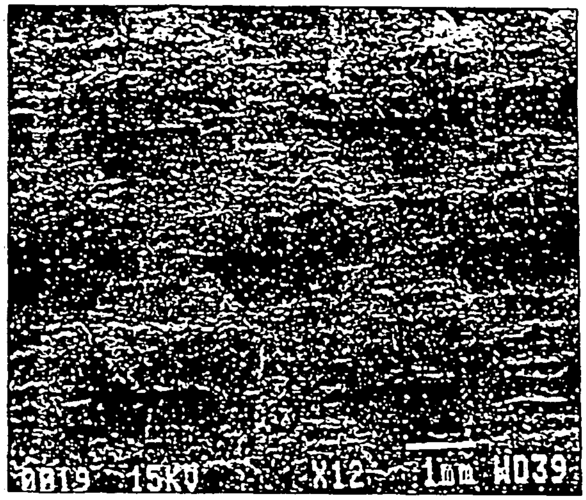
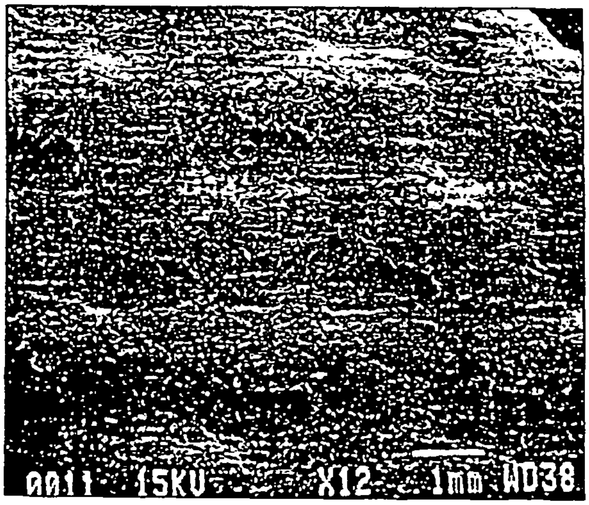
FIGURE 29

FIGURE 31
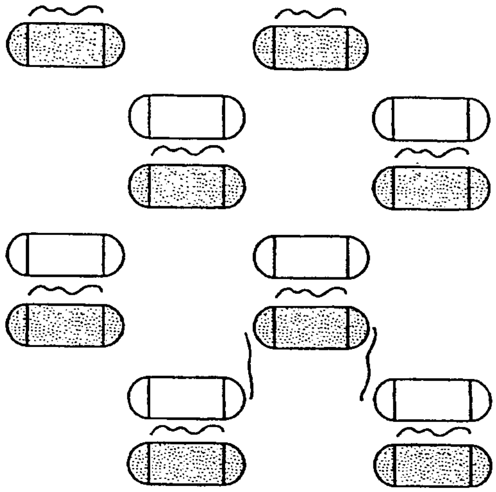
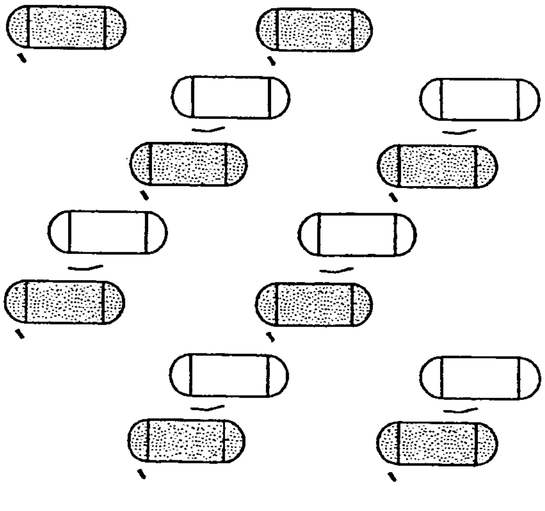
FIGURE 32

FIGURE 36
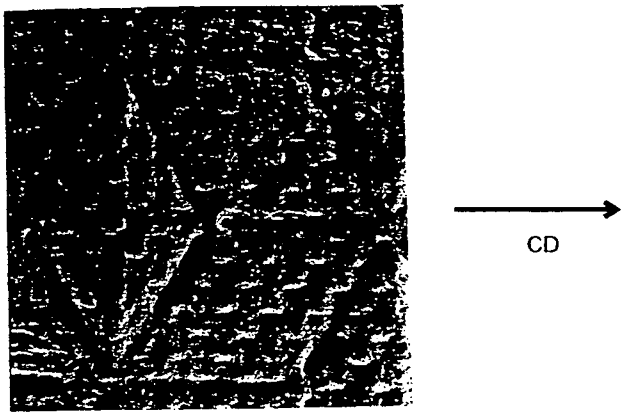
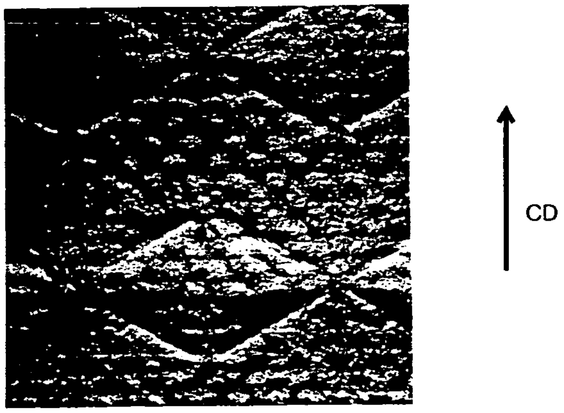
FIGURE 37

EMBOSSING SYSTEM AND PRODUCT MADE THEREBY WITH BOTH PERFORATE BOSSES IN THE CROSS MACHINE DIRECTION AND A MACRO PATTERN

This application is a divisional of, and claims priority to, application Ser. No. 11/002,801, filed Dec. 3, 2004, now U.S. Pat. No. 8,178,025 under 35 U.S.C. §120. U.S. application Ser. No. 11/002,801 entitled "EMBOSSING SYSTEM AND PRODUCT MADE THEREBY WITH BOTH PERFORATE BOSSES IN THE CROSS MACHINE DIRECTION AND A MACRO PATTERN" dated Dec. 3, 2004, is incorporated herein by reference in their entireties.

BACKGROUND OF THE INVENTION

The present invention relates generally to the manufacture of absorbent creped paper products including both cube embossing and substantially cross-machine direction perforate embossing. In one embodiment, the products are made from furnish incorporating at least about 15% bleached chemithermomechanical pulp (BCTMP).

Embossing is the act of mechanically working a substrate, such as a web or a cellulosic web, to cause the substrate to conform under pressure to the depths and contours of a patterned embossing roll. Generally the web is passed between a pair of embossing rolls that, under pressure, form contours within the surface of the web. During an embossing process, the roll pattern is imparted onto the web at a certain pressure and/or penetration. In perforate embossing the embossing elements are configured such that at least a portion of the web located between the embossing elements is perforated. As used herein, "perforated" refers to the existence of at least one of (1) a macro-scale through aperture in the web, (2) when a macro-scale through aperture does not exist, at least incipient tearing such as would increase the transmittivity of light through a small region of the web, or (3) a decrease the machine direction strength of a web by at least 15% for a given range of embossing depths.

Embossing is commonly used to modify the properties of a web to make a final product produced from that web more appealing to the consumer. For example, embossing a web can improve the softness, absorbency, and bulk of a final product. Embossing can also be used to impart an appealing pattern to a final product.

Embossing is carried out by passing a web between two or more embossing rolls, at least one of which carries the desired emboss pattern. Known embossing configurations include rigid-to-resilient embossing and rigid-to-rigid embossing.

In a rigid-to-resilient embossing system, a single or multi-ply substrate is passed through a nip formed between a first roll, whose substantially rigid surface contains the embossing pattern as a multiplicity of protuberances and/or depressions arranged in an aesthetically-pleasing manner, and a second roll, whose substantially resilient surface can be either smooth or also contain a multiplicity of protuberances and/or depressions that may cooperate with the rigid surfaced patterned roll. Commonly, rigid rolls are formed with a steel body which is either directly engraved upon or which can contain a hard rubber cover or other suitable rigid surface (directly coated or sleeved) upon which the embossing pattern is formed by any convenient method such as, for example, laser engraving. The resilient roll may consist of a steel core provided with a resilient surface, such as being directly covered or sleeved with a resilient material such as rubber or other suitable polymer. The resilient surface may be either smooth or engraved with a pattern. The pattern on the resilient roll may be either a mated or a non-mated pattern with respect to the pattern carried on the rigid roll.

In a rigid-to-rigid embossing process, a single-ply or multi-ply substrate is passed through a nip formed between two substantially rigid rolls. The surfaces of both rolls contain the pattern to be embossed as a multiplicity of protuberances and/or depressions arranged into an aesthetically-pleasing manner where the protuberances and/or depressions in the second roll may cooperate with those patterned in the first rigid roll. The first rigid roll may be formed, for example, with a steel body which is either directly engraved upon or which can contain a hard rubber cover or other suitable rigid surface (directly coated or sleeved) upon which the embossing pattern is engraved by any conventional method, such as laser engraving. The second rigid roll can be formed with a steel body or can contain a hard rubber cover or other suitable rigid surface (directly coated or sleeved) upon which any convenient pattern, such as a matching or mated pattern, is conventionally engraved or laser-engraved. In perforate embossing, a rigid-to-rigid embossing system is typically used; however, a rigid-resilient configuration may also be used for perforate embossing.

When substantially rectangular embossing elements have been employed in perforate embossing, the embossing elements on the embossing rolls have generally been oriented so that the long direction axis, i.e., the major axis, of the elements extend only in the machine direction. That is, the major axis of the elements is oriented to correspond to the direction of the running web being embossed. These elements are referred to as machine direction elements. As a result, the elements produce perforations which extend primarily in the machine direction and undesirably decrease the strength of the web in the cross-machine direction. This orientation improves absorbency and softness but can degrade, i.e., reduce the strength of, the web primarily in the cross-machine direction while less significantly degrading the strength of the web in the machine direction. As a result, the tensile strength of the web in the cross-machine direction is reduced relatively more, on a percentage basis, than that of the machine direction. In addition, the cross-machine direction strength of the base sheet is typically less than that of the machine direction strength. As a result, by embossing with machine direction elements only, the cross-machine direction strength is even further weakened and, accordingly, because the finished product will fail in the weakest direction, the product will be more likely to fail when stressed in the cross-machine direction.

Cross-machine direction tensile strength can be associated with consumer preference for paper toweling. In particular, consumers prefer a strong towel, of which cross-machine direction and machine direction strength are two components. Because an un-embossed base sheet is typically much stronger in the machine direction than the cross-machine direction, a process is desired which results in improved softness without sustaining excessive losses in cross-machine direction tensile strength.

The present invention addresses at least the above described problem by providing at least one embossing pattern, wherein at least a portion of the elements are oriented to provide perforating nips which are substantially in the cross-machine direction and are configured to perforate emboss (perf-emboss) the web, thereby preserving more of the cross-machine direction strength. In addition, the present invention may also provide at least two embossing rolls, where the embossing elements on at least one embossing roll are configured to impart an embossing pattern on the web, and where the embossing pattern includes elongated embosses in one or both of the machine direction and the cross-machine direction.

Additionally, in view of the rising costs of virgin fibers, the use of recycled cellulosic furnish to make towel and tissue products is often desirable, especially for facilities that produce large volumes of absorbent products. Products made from recycle furnish, however, tend to be relatively stiff, having relatively high tensile strengths and relatively low bulk leading to poor absorbency and softness properties. Moreover, these products tend to have relatively low wet/dry strength ratios. Various methods have been employed to increase the bulk and softness of products made from recycle furnish, including the use of softeners, debonders, and the like, the use of anfractuous fibers, and/or the use of new processing techniques. Many of these methods require significant capital investment and cannot be readily adapted to existing production capacity, such as conventional wet-press (CWP) paper machines with Yankee dryers.

There is disclosed in U.S. Pat. No. 5,607,551, which is incorporated herein by reference in its entirety, through-air-dried (TAD) tissues made without the use of a Yankee dryer. The typical Yankee functions of building machine direction and cross-machine direction stretch are replaced by a wet end rush transfer and the through-air-drying fabric design, respectively. According to the '551 patent, it is particularly advantageous to form the tissue with chemi-mechanically treated fibers in at least one layer. Resulting tissues are reported to have high bulk and low stiffness. Furnishes enumerated in connection with the '551 patent process include virgin softwood and hardwood as well as secondary or recycle fibers (see col. 4, lines 28-31). In the '551 patent it is further taught to incorporate high-lignin content fibers such as groundwood, thermomechanical pulp, chemimechanical pulp, and bleached chemithermomechanical pulp. Generally these pulps have lignin contents of about 15 percent or greater, whereas chemical pulps (Kraft and sulfite) are low yield pulps having a lignin content of about 5 percent or less. The high-lignin fibers are subjected to a dispersing treatment in a disperser in order to introduce curl into the fibers. The temperature of the fiber suspension during dispersion may be about 140° F. or greater. In one embodiment, the temperature may be about 150° F. or greater and, in yet another embodiment, the temperature may be about 210° F. or greater. The upper limit on the temperature may be dictated by whether or not the apparatus is pressurized, since the aqueous fiber suspensions within an apparatus operating at atmospheric pressure should not be heated above the boiling point of water.

It is believed that the degree of permanency of the curl is greatly impacted by the amount of lignin in the fibers being subjected to the dispersing process, with greater effects being attainable for fibers having higher lignin content (see col. 5, lines 43 and following). Lignin-rich, high coarseness, generally tubular fibers are further described in U.S. Pat. Nos. 6,254,725, 6,074,527, 6,287,422, 6,162,961, 5,932,068, 5,772,845, and 5,656,132, each of which is incorporated herein by reference in its entirety. The so-called uncreped, through-air-dried process of the '551 patent requires a relatively high capital investment and is expensive to operate inasmuch as thermal dewatering of the web is energy intensive and is sensitive to fiber composition.

Commercial success has also been achieved in connection with U.S. Pat. No. 5,690,788, which is incorporated herein by reference in its entirety. In accordance with the '788 patent, there is provided biaxially undulatory single ply and multiply tissues, single ply and multiply towels, single ply and multiply napkins, and other personal care and cleaning products, as well as creping blades and processes for the manufacture for such paper products. Generally speaking, there is provided in accordance with the '788 patent a creping blade provided with an undulatory rake surface having trough-shaped serrulations in the rake surface of the blade. The undulatory creping blade has a multiplicity of alternating serrulated sections of either uniform depth or a multiplicity of arrays of serrulations having non-uniform depth. The blade is operative to impart a biaxially undulatory structure to the creped web such that the product exhibits increased absorbency and softness with a variety of furnishes. Specifically disclosed are conventional furnishes such as softwood, hardwood, recycle, mechanical pulps (including thermo-mechanical and chemithermomechanical pulp), anfractuous fibers, and combinations of these (see col. 20, line 41 and following). Example 20 of the '788 patent notes the properties obtained when using the undulatory blade in the manufacture of towels including up to 30 percent anfractuous fiber high bulk additive (HBA). HBA is a commercially available softwood Kraft pulp sold by Weyerhauser Corporation that has been rendered anfractuous by physically and chemically treating the pulp such that the fibers have permanent kinks and curls imparted to them. Inclusion of the HBA fibers into the base sheet will serve to improve the sheet's bulk and absorbency.

Despite many advances in the art, there is an ever present need for further improvements to products which incorporate cellulosic fiber such as recycled fiber, especially those improvements that do so on a cost-effective basis in terms of required capital and operating costs. It has also been found that there is a benefit between the use of an undulatory creping blade and the incorporation of certain high yield fibers into a web.

As embodied and broadly described herein, the invention includes an embossing system for embossing at least a portion of a web comprising a first roll and at least a second roll, the first roll and second roll defining a first nip for embossing the web, wherein at least one of the first roll and the second roll may include elongated embossing elements extending substantially in the machine direction and at least one of the first roll and the second roll may include perforate embossing elements extending substantially in the cross-machine direction, and wherein the embossing elements are capable of imparting a perforate pattern and/or a cube embossing pattern on the web. The embossing elements extending substantially in the machine direction and the perforate embossing elements extending substantially in the cross-machine direction may be provided on the same or both of the first and the second embossing rolls. In one embodiment, the web may be a cellulosic fibrous web, wherein at least about 15% by weight of the fiber, based on the weight of the cellulosic fiber in the furnish, is lignin-rich, high coarseness fiber having generally tubular fiber configuration, as well as an average fiber length of at least about 2 mm and a coarseness of at least about 20 mg/100 m. In another embodiment, the web may be creped with an undulatory creping blade. In a further embodiment, both the first and second rolls include elongated mated embossing elements extending substantially in the machine direction. In yet another embodiment, the elongated embossing elements extending substantially in the machine direction are capable of imparting a cube embossing pattern to the web, and the perforate embossing elements extending substantially in the cross-machine direction are capable of imparting a perforate pattern to the web.

Another embodiment of the invention includes a method of embossing at least a portion of a web, including providing a first roll and providing at least a second roll, the first roll and the second roll defining a first nip, providing a cellulosic fibrous web to be embossed, and passing the web between the first nip, wherein at least one of the first roll and the second roll has elongated embossing elements extending substantially in the machine direction and/or the cross-machine direction and optionally at least one of the first roll and the second roll has perforate embossing elements, that may or may not be elongated, extending substantially in the cross-machine direction, and wherein the elongated embossing elements impart a cube embossing pattern on the web. In one embodiment, both of the substantially machine direction embossing elements and the substantially cross-machine direction perforate embossing elements are on the same roll. In another embodiment, both the first and second rolls include elongated mated embossing elements substantially in the machine direction and/or the cross-machine direction. In a further embodiment, the elongated embossing elements extending substantially in the machine direction and/or the cross-machine direction are capable of imparting a cube emboss pattern to the web, and the perforate embossing elements, that are not elongated, extending substantially in the cross-machine direction are capable of imparting a perforate emboss to the web. In yet a further embodiment, at least one of the first roll and the second roll have both elongated embossing elements extending substantially in the machine direction and elongated embossing elements extending substantially in the cross-machine direction that are capable of imparting a cube emboss pattern to the web, and no perforate embossing elements extending substantially in the cross-machine direction are capable of imparting a perforate emboss to the web. In still a further embodiment, at least one of the first roll and the second roll have both elongated embossing elements extending substantially in the machine direction and elongated embossing elements extending substantially in the cross-machine direction that are capable of imparting a cube emboss pattern to the web, and perforate embossing elements extending substantially in the cross-machine direction that are capable of imparting a perforate emboss to the web.

In another embodiment of the present invention, a first roll and a second roll are provided, the first roll and the second roll defining a first nip for embossing a web, wherein at least one of the first roll or the second roll includes elongated embossing elements substantially extending in the machine direction, wherein at least one of the first roll and the second roll includes elongated embossing elements extending substantially in the cross-machine direction, and wherein at least one of the first and the second roll includes substantially cross-machine direction embossing elements. In one embodiment, the substantially cross-machine direction embossing elements are perforate embossing elements. In another embodiment, each of the elongated substantially machine direction embossing elements, the elongated substantially cross-machine direction embossing elements, and the substantially cross-machine direction elements may be on one roll. In a further embodiment, both the first roll and the second roll include elongated mated embossing elements extending substantially in the machine direction and/or the cross-machine direction. In yet another embodiment, the elongated embossing elements extending substantially in the machine direction and the elongated embossing elements extending substantially in the cross-machine direction are capable of imparting a cube emboss pattern to the web, and the perforate embossing elements, that are not elongated, extending substantially in the cross-machine direction are capable of imparting a perforate emboss to the web.

The accompanying drawings, which are incorporated herein and constitute a part of this specification, illustrate an embodiment of the invention, and, together with the description, serve to explain the principles of the invention. Further advantages of the invention will be set forth in part in the description which follows and in part will be apparent from the description or may be learned by practice of the invention. The advantages of the invention may be realized and attained by means of the instrumentalities and combinations particularly pointed out in the appended claims.

BRIEF DESCRIPTION OF DRAWINGS

FIGS. 3A-3D are schematic diagrams illustrating the geometry of an undulatory creping blade utilized in accordance with the present invention.

FIG. 18A illustrates embossing rolls having cross-machine direction elements according to an embodiment of the present invention and FIGS. 18B-D illustrate cross-machine direction elements according to an embodiment of the present invention.

FIG. 19 illustrates cross-machine direction elements according to another embodiment of the present invention.

FIG. 20 illustrates cross-machine direction elements according to yet another embodiment of the present invention.

FIG. 24 illustrates the alignment of the cross-machine direction elements according to an embodiment of the present invention.

FIG. 25 illustrates the alignment of the cross-machine direction elements according to another embodiment of the present invention.

FIG. 26 illustrates the alignment of the cross-machine direction elements according to yet another embodiment of the present invention.

FIG. 27 illustrates the alignment of the cross-machine direction elements according to still another embodiment of the present invention.

FIG. 28 is a photomicrograph illustrating the effect of cross-machine direction elements on a web according to an embodiment of the present invention.

FIG. 29 is a photomicrograph illustrating the effect of cross-machine direction elements on a web according to another embodiment of the present invention.

FIG. 31 illustrates the effect of cross-machine direction elements on a web according to an embodiment of the present invention.

FIG. 32 illustrates the effect of cross-machine direction elements on a web according to another embodiment of the present invention.

FIG. 36 illustrates embossing elements according to an embodiment of the present invention.

FIG. 37 illustrates embossing elements according to another embodiment of the present invention.

DETAILED DESCRIPTION OF THE EMBODIMENTS

Figure 1:
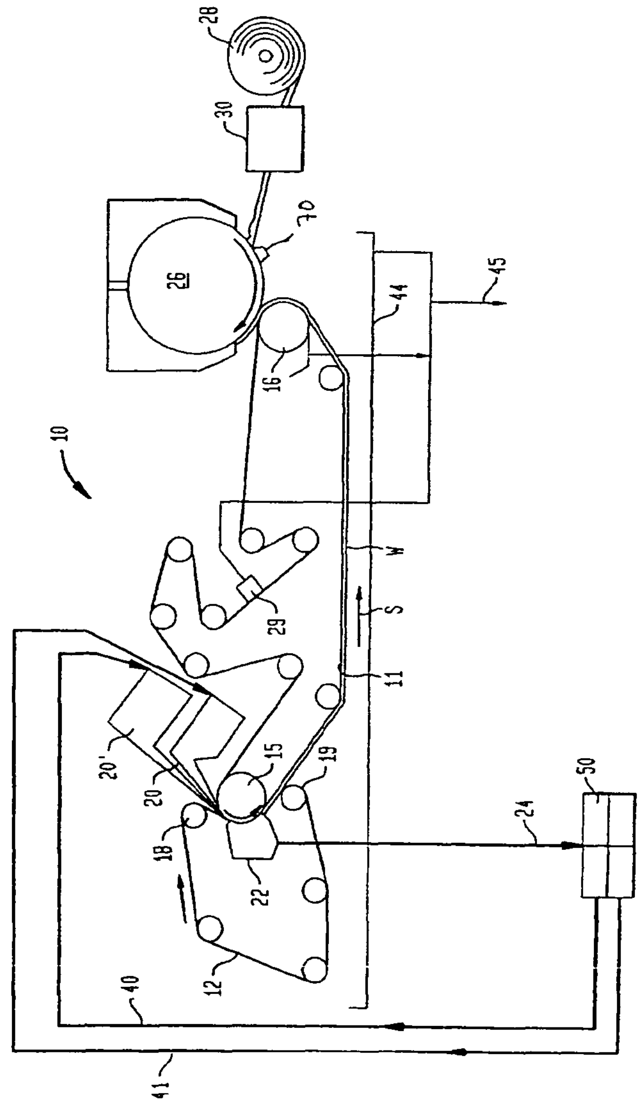
FIG. 1 is a schematic diagram of a papermaking machine useful for the practice of the present invention.

Reference will now be made in detail to embodiments of the present invention, examples of which are illustrated in the accompanying drawings. Combinations and variants of the individual embodiments discussed are both intended and fully envisioned. The invention is described in detail below for purposes of description and exemplification only. Modifications within the spirit and scope of the present invention, set forth in the appended claims, will be readily apparent to those of skill in the art.

The present invention may be used with a variety of types of wet-laid cellulosic webs, including paper and the like. In addition, the present invention may be used with a variety of types of through-air-dried (TAD) cellulosic webs, including paper and the like. The webs may be continuous or of a fixed length. Moreover, the webs may be used to produce any art recognized product, including, but not limited to, absorbent paper products, for example, paper towels, napkins, facial tissue, bath tissue and the like. Moreover, the resulting product may be a single ply or a multi-ply paper product, or a laminated paper product having multiple plies.

The present invention may be used with a web made from one or more of virgin furnish, recycled furnish, and synthetic fibers. Fibers suitable for making the webs of this invention include: non-woody fibers, such as cotton fibers or cotton derivatives, abaca, kenaf, flax, esparto grass, straw, jute hemp, bagasse, milkweed floss fibers, and pineapple leaf fibers; and woody fibers, such as those obtained from deciduous and coniferous trees, including: softwood fibers, such as northern and southern softwood kraft fibers; and hardwood fibers, such as eucalyptus, maple, birch, aspen, and the like. Papermaking fibers may be liberated from their source material by any one of a number of chemical pulping processes familiar to one experienced in the art, including sulfate, sulfite, polysulfide, soda pulping, and the like. The pulp may be bleached, if desired, by chemical means including the use of chlorine, chlorine dioxide, oxygen, and the like.

In at least one embodiment, the products of the present invention comprise a blend of conventional fibers (whether derived from virgin pulp, recycle, and/or synthetic sources) and high coarseness, lignin-rich tubular fibers.

Conventional fibers for use according to the present invention are also procured by recycling of pre- and post-consumer paper products. Fiber may be obtained, for example, from: the recycling of printers' trims and cuttings, including book and clay coated paper; post consumer paper, including office paper; and curbside paper recycling, including old newspaper. The various collected paper can be recycled using any means common to the recycled paper industry. As the term is used herein, recycle or secondary fibers include those fibers and pulps which have been previously formed into a web and then re-isolated from that web matrix by some physical, chemical, and/or mechanical means. The papers may be sorted and graded prior to pulping in conventional low, mid, and high-consistency pulpers. In the pulpers the papers are mixed with water and agitated to break the fibers free from the sheet. Chemicals may be added in this process to improve the dispersion of the fibers in the slurry and to improve the reduction of contaminants that may be present. Following pulping, the slurry is usually passed through various sizes and types of screens and cleaners to remove the larger solid contaminants while retaining the fibers. It is during this process that such waste contaminants such as paper clips and plastic residuals are removed. The pulp is then generally washed to remove smaller sized contaminants, for instance those consisting primarily of inks, dyes, fines, and ash. This process is generally referred to as deinking. Deinking can be accomplished by several different processes, including wash deinking, flotation deinking, enzymatic deinking, and the like. One example of a deinking process by which recycled fiber for use in the present invention may be obtained is called floatation deinking. In this process small air bubbles are introduced into a column of the furnish. As the bubbles rise they tend to attract small particles of dye and ash. Once upon the surface of the column of stock they are skimmed off.

In one embodiment, the conventional fibers according to the present invention may consist predominantly of secondary or recycle fibers that possess significant amounts of ash and fines. It is common in the papermaking industry for the term ash to be associated with virgin fibers. This usage is generally defined as the amount of ash that would be created if the fibers were burned. Typically no more than about 0.1% to about 0.2% ash is found in virgin fibers. Ash, as the term is used herein, includes this "ash" associated with virgin fibers as well as contaminants resulting from prior use of the fiber. Furnishes utilized in connection with the present invention may include excess amounts of ash, for example, greater than about 1% or more. Ash originates primarily when fillers or coatings are added to paper during formation of a filled or coated paper product. Ash will typically be a mixture containing titanium dioxide, kaolin clay, calcium carbonate, and/or silica. This excess ash or particulate matter is what has traditionally interfered with processes using recycle fibers, thus making the use of recycled fibers unattractive. In general, recycled paper containing high amounts of ash is priced substantially lower than recycled papers with low or insignificant ash content.

Furnishes containing excessive ash also typically contain significant amounts of fines. Fines constitute material within the furnish that will pass through a 100 mesh screen. Ash content may be determined using TAPPI Standard Method T211 OM93. Ash and fines are most often associated with secondary, recycled fibers, post-consumer paper, and converting broke from printing plants and the like. Secondary, recycled fibers with excessive amounts of ash and significant fines are available on the market and are inexpensive because it is generally accepted that only very thin, rough, economy towel and tissue products can be made from these fibers unless the furnish is processed to remove the ash and fines. The present invention makes it possible to achieve a paper product with high void volume and good softness and/or absorbency properties from secondary fibers having significant amounts of ash and fines without any need to preprocess the fiber to remove fines and ash. While the present invention contemplates the use of fiber mixtures, including the use of virgin fibers, fiber in the products according to the present invention may have, in some embodiments, greater than about 0.75% ash, and in additional embodiments more than about 1% ash.

Lignin-rich cellulosic pulps or fibers having high coarseness and generally tubular structure used in the products and processes of the present invention are typically those known in the industry as "high-yield" pulps due to their high yield based on the cellulosic feed to the respective pulping and/or treatment processes. Thermomechanical pulp (TMP) and chemithermomechanical pulp (CTMP), as well as bleached chemithermomechanical pulp (BCTMP) and alkaline peroxide mechanical pulp (APMP), are suitable. Such pulps may have a lignin content of at least about 5% and sometimes more than about 10%. In some embodiments, the pulp has a lignin content of more than about 15% up to about 30% or more. In some embodiments the pulps are at least one of TMP, CTMP, BCTMP, and APMP having lignin contents of from about 15% to about 25%.

TMP is a mechanical pulp produced from wood chips where the wood particles are softened by preheating, before a pressurized primary refining stage, in a pressurized vessel at temperatures not exceeding the glass transition temperature of lignin. CTMP is produced from chemically impregnated wood chips by means of pressurized refining at high consistencies. APMP is produced by way of a chemimechanical pulping process, where the chemical impregnation of the wood chips is carried out by alkaline peroxide prior to refining at atmospheric conditions.

BCTMP is CTMP bleached to a higher brightness, typically about 80 GE or higher. GE brightness, as used herein, measures the amount of light reflected from the surface of a pulp and is highly dependant not only on the type of pulp but also on the degree to which it is bleached. It is measured by comparing the amount of essentially parallel light beams reflected by a pulp surface when illuminated at an angle of 45°, to the amount of same light reflected by the surface of magnesium oxide, which is the standard of 100%. The specific process for measuring GE brightness is disclosed in TAPPI T-452 "Brightness of Pulp, Paper, and Paperboard (Directional Reflectance at 457 nm)."Differences between BTCMP and recycle fiber can be appreciated by reference to Table 1 below.

TABLE 1

Exemplary Comparison Between BCTMP and Recycle Fiber

| | Volume ($cm^3$/gm) | Tensile (km) | Fiber Length (mm) | Coarseness (mg/100 m) | Mean Curl (mm) | % Ash |
|---|---|---|---|---|---|---|
| Recycle #1 (high bright) | 1.55 | 3.41 | 1.94 | 11.70 | 0.09 | 4.99 |
| Recycle #2 (semi-bleach) | 1.71 | 2.97 | 2.17 | 13.50 | 0.07 | 3.59 |
| Millar Western Softwood BCTMP | 2.70 | 2.78 | 2.50 | 26.50 | 0.03 | 1.42 |
| Millar Western Hardwood BCTMP | 2.41 | 2.04 | 1.23 | 16.50 | 0.03 | 0.84 |

Figure 11A:
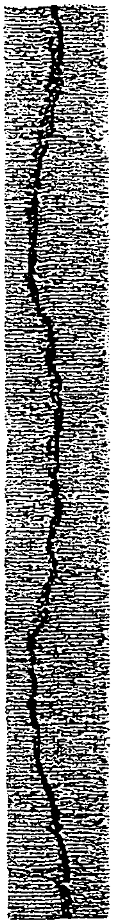
FIG. 11A is a 50× light microscopy sectional photomicrograph showing internal delamination of a creped product without high coarseness, tubular fibers.
Figure 11B:
FIG. 11B is a 50× light microscopy sectional photomicrograph showing internal delamination of a creped product containing 40% lignin-rich generally tubular fibers with high coarseness.
Figure 11C:
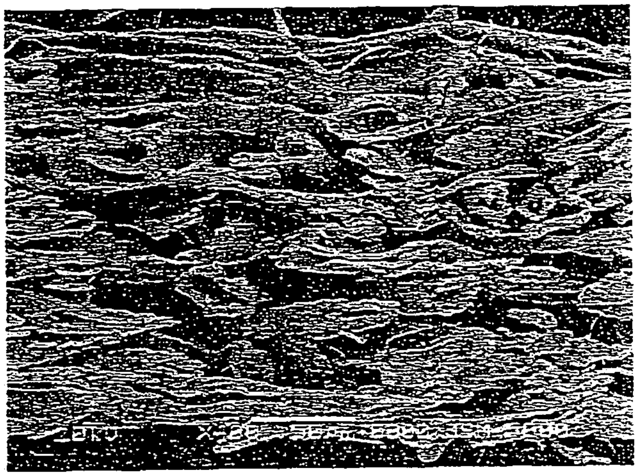
FIG. 11C is a Scanning Electron Micrograph (SEM) (400×) illustrating the generally tubular structure of high coarseness fibers of the present invention when formed into a handsheet.
Figure 11D:
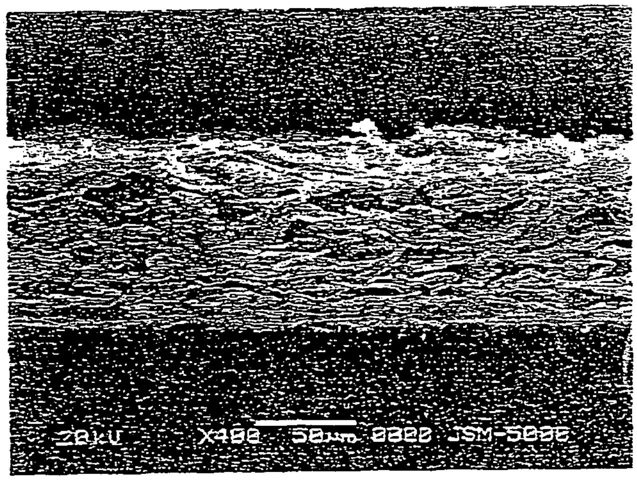
FIG. 11D is a Scanning Electron Micrograph (SEM) (400×) illustrating the generally ribbon-like structure of conventional fibers when formed into a handsheet.

It will also be appreciated from FIGS. 11C and 11D that the high coarseness, generally tubular fibers used in connection with the invention retain their open centered shape of only partially flattened "tubes" in 11C as compared to the ribbon-like or almost fully flattened or closed center configuration of conventional papermaking fibers seen in FIG. 11D. It appears that a few less than completely flattened fibers are present in the photomicrograph of FIG. 11D, but the majority of fibers are truly ribbon-like. In accordance with the present invention, there may be provided generally tubular, coarse fibers as seen in FIG. 11C. FIG. 11C is an SEM photomicrograph (400×) of a handsheet made from softwood BCTMP, whereas FIG. 11D is an SEM photomicrograph (400×) of a handsheet made from a conventional pulp.

The various high-lignin pulps employed in connection with the present invention may be prepared by any suitable method. For example, mechanical pulp may be bleached as described in U.S. Pat. No. 6,136,041 entitled "Method for Bleaching Lignocellulosic Fibers," which is incorporated herein by reference in its entirety. Suitable bleached pulps may include BCTMP with about a 21% lignin content bleached with hydrogen peroxide, sulfite, and caustic.

Suitable lignin-rich, high coarseness, and generally tubular cellulosic fibers include fibers selected at least one of APMP, TMP, CTMP, and BCTMP, as defined herein. In one embodiment, these fibers may be present in an amount of from about 20 to about 40 percent by weight. BCTMP is a particularly suitable fiber for many products and may have a lignin content in various embodiments of at least about 15%, at least about 20%, or at least about 25% by weight. BTCMP with a lignin content of about 25% to about 35% may also be employed.

The high coarseness and generally tubular lignin-rich fiber may be derived from softwood in many embodiments and may be at least one of APMP, TMP, CTMP, and BCTMP.

Moreover, these high coarseness and generally tubular lignin-rich fibers may be used in combination with virgin pulp and/or recycled fiber.

Lignin content is measured by way of TAPPI method T222-98 (acid insoluble lignin). In this method, the carbohydrates in wood and pulp are hydrolyzed and solubilized by sulfuric acid. The acid-insoluble lignin is filtered off, dried, and then weighed.

Fiber length and coarseness can be measured using a fiber-measuring instrument such as the Kajaani FS-200 analyzer available from Valmet Automation of Norcross, Ga., or an OPTEST FQA. For fiber length measurements, a dilute suspension of the fibers (about 0.5 to 0.6 percent), whose length is to be measured, may be prepared in a sample beaker and the instrument operated according to the procedures recommended by the manufacturer. The reported range for fiber lengths is set at an instrument's minimum value of, for example, 0.07 mm and a maximum value of, for example, 7.2 mm. Fibers having lengths outside of the selected range are excluded. Three calculated average fiber lengths may be reported. The arithmetic average length is the sum of the product of the number of fibers measured and the length of the fiber divided by the sum of the number of fibers measured. The length-weighted average fiber length is defined as the sum of the product of the number of fibers measured and the length of each fiber squared divided by the sum of the product of the number of fibers measured and the length the fiber. The weight-weighted average fiber length is defined as the sum of the product of the number of fibers measured and the length of the fiber cubed divided by the sum of the product of the number of fibers and the length of the fiber squared. As used herein throughout this specification and claims, unless indicated otherwise, the weight-weighted average fiber length is referred to by the terminology "average fiber length," "fiber length," and the like.

Fiber coarseness is the weight of fibers in a sample per a given length and is usually reported as mg/100 meters. The fiber coarseness of a sample is measured from a pulp or paper sample that has been dried and then conditioned at, for example, 72° F. and 50% relative humidity for at least four hours. The fibers used in the coarseness measurement are removed from the sample using tweezers to avoid contamination. The weight of fiber that is chosen for the coarseness determination depends on the estimated fraction of hardwood and softwood in the sample, and range from about 3 mg for an all-hardwood sample to about 14 mg for a sample composed entirely of softwood. The portion of the sample to be used in the coarseness measurement is weighed to the nearest 0.00001 gram and is then slurried in water. To insure that a uniform fiber suspension is obtained and that all fiber clumps are dispersed, an instrument such as the Soniprep 150, available from Sanyo Gallenkamp of Uxbridge, Middlesex, UK, may be used to disperse the fiber. After dispersion, the fiber sample is transferred to a sample cup, taking care to insure that the entire sample is transferred. The cup is then placed in the fiber analyzer as noted above. The dry weight of pulp used in the measurement, which is calculated by multiplying the weight obtained above by 0.93 to compensate for the moisture in the fiber, is entered into the analyzer and the coarseness is determined using the procedure recommended by the manufacturer.

In one embodiment of the present invention, predominantly recycled fiber (i.e., more than about 50% by weight based on the weight of cellulosic fiber in the sheet) with at least about 15% by weight high yield, lignin-rich cellulosic fiber is used. In various embodiments, at least about 60%, at least about 75%, or at least about 80% recycle fiber may be incorporated into the sheet if so desired. Specific features and embodiments of the invention are further described below.

The suspension of fibers or furnish may contain chemical additives to alter the physical properties of the paper produced. These chemistries are well understood by the skilled artisan and may be used in any known combination. Such additives may include surface modifiers, softeners, debonders, strength aids, latexes, opacifiers, optical brighteners, dyes, pigments, sizing agents, barrier chemicals, retention aids, insolubilizers, organic or inorganic crosslinkers, or combinations thereof; the chemicals optionally comprising polyols, starches, PPG esters, PEG esters, phospholipids, surfactants, polyamines, and the like. In addition, such additives may include any known or later developed chemistries that may be readily apparent to the skilled artisan.

The sheet may be prepared by a wet-crepe process for making absorbent sheet comprising: (a) preparing an aqueous fibrous cellulosic furnish comprising high coarseness, generally tubular and possibly lignin-rich cellulosic fiber; (b) depositing the aqueous fibrous furnish on a foraminous support; (c) dewatering the furnish to form a web; (d) applying the dewatered web to a heated rotating cylinder and drying the web to a consistency of greater than about 30% and less than about 90%; (e) creping the web from the heated cylinder at the consistency of greater than about 30% and less than about 90% with a creping blade provided with a creping surface adapted to contact the cylinder; and (f) drying the web subsequent to creping the web from the heated cylinder to form the absorbent sheet. In one embodiment, the web may be dried to a consistency of from about 40% to about 80% prior to creping the web from the heated rotating cylinder. In another embodiment, the web may be dried to a consistency of from about 50% to about 75% prior to creping from the heated rotating cylinder. In yet another embodiment, an undulatory creping blade may be used.

Another process which may be employed is a dry-crepe process that may or may not use an after-crepe dryer. A dry-crepe process for making absorbent sheet of the invention includes: (a) preparing an aqueous cellulosic fibrous furnish wherein at least about 15% by weight of the fiber based on the weight of cellulosic fiber in the ash is lignin-rich coarse fiber having a generally tubular fiber configuration as well as an average fiber length of at least about 2 mm and a coarseness of at least about 20 mg/100 m; (b) depositing the aqueous fibrous furnish on a foraminous support; (c) dewatering the furnish to form a web; (d) applying the dewatered web to a heated rotating cylinder and drying the web to a consistency of about 90% or greater; (e) creping the web from the heated cylinder at the consistency of about 90% or more with a creping blade provided with an undulatory creping surface adapted to contact the cylinder; and optionally (f) drying the web subsequent to creping the web from the heated cylinder to form the absorbent sheet. In one embodiment, the web is dried to a consistency of greater than about 95%.

The present invention can be used in a variety of different processes, including conventional wet press processes and through-air-drying processes. In addition, to increase the smoothness of the resulting product, the web may be calendared. Moreover, to increase the bulkiness of the product, an undulatory creping blade may be used, such as described in U.S. Pat. No. 5,690,788, which is herein incorporated by reference in its entirety. Those of ordinary skill in the art will understand the variety of processes in which the above-described invention can be employed.

FIG. 1 illustrates an embodiment of the present invention where a machine chest 50, which may be compartmentalized, is used for preparing furnishes that are treated with chemicals having different functionality depending on the character of the various fibers used. This embodiment shows two head boxes, thereby making it possible to produce a stratified product. The product according to the present invention can be made with single or multiple head boxes and regardless of the number of head boxes may be stratified or unstratified. The treated furnish is transported through different conduits 40 and 41, where they are delivered to the head box 20, 20' (indicating an optionally compartmented headbox) of a crescent forming machine 10.

FIG. 1 also shows a web-forming end or wet end with a liquid permeable foraminous support member 11 which may be of any conventional or later developed configuration. The foraminous support member 11 may be constructed of any of several materials including, but not limited to, photopolymer fabric, felt, fabric, or a synthetic filament woven mesh base with a very fine synthetic fiber batt attached to the mesh base. The foraminous support member 11 may be supported in any known or later developed manner on rolls, for instance including a breast roll 15 and a couch or pressing roll 16.

A forming fabric is supported on rolls 18 and 19, which are positioned relative to the breast roll 15 for pressing the press wire 12 to converge on the foraminous support member 11. The foraminous support member 11 and the wire 12 move in the same speed and at the same direction, which is in the direction of rotation of the breast roll 15. The pressing wire 12 and the foraminous support member 11 converge at an upper surface of the forming roll 15 to form a wedge-shaped space or nip into which one or more jets of water or foamed liquid fiber dispersion (furnish) provided by single or multiple headboxes 20, 20' is pressed between the pressing wire 12 and the foraminous support member 11 to force fluid through the wire 12 and into a saveall 22 where it is collected to reuse in the process.

According to the embodiment in FIG. 1, the nascent web W formed in the process is carried by the foraminous support member 11 to the pressing roll 16 where the nascent web W is transferred to the drum 26 of a Yankee dryer. Fluid is pressed from the web W by the pressing roll 16 as the web is transferred to the drum 26 of a dryer where it is partially dried and possibly wet-creped by means of an undulatory creping blade 70. According to this embodiment, the web is then transferred to an after-drying section 30 prior to being collected on a take-up roll 28. The drying section 30 may include through-air-dryers, impingement dryers, can dryers, another Yankee dryer, and the like, as is well known in the art and discussed further below.

A pit 44 is provided for collecting water squeezed from the furnish by the press roll 16 and a Uhle box 29. The water collected in the pit 44 may be collected into a flow line 45 for separate processing to remove surfactant and/or fibers from the water and to permit recycling of the water back to the papermaking machine 10.

According to the present invention, an absorbent paper web may be made by dispersing fibers into an aqueous slurry and depositing the aqueous slurry onto the forming wire of a papermaking machine. Any suitable forming scheme might be used. For example, an extensive but non-exhaustive list includes a crescent former, a C-wrap twin wire former, an S-wrap twin wire former, a suction breast roll former, a Fourdrinier former, or any art-recognized forming configuration. The forming fabric can be any suitable foraminous member, including single layer fabrics, double layer fabrics, triple layer fabrics, photopolymer fabrics, and the like. A non-exhaustive list of background art in the forming fabric area includes U.S. Pat. Nos. 4,157,276; 4,605,585; 4,161,195; 3,545,705; 3,549,742; 3,858,623; 4,041,989; 4,071,050; 4,112,982; 4,149,571; 4,182,381; 4,184,519; 4,314,589; 4,359,069; 4,376,455; 4,379,735; 4,453,573; 4,564,052; 4,592,395; 4,611,639; 4,640,741; 4,709,732; 4,759,391; 4,759,976; 4,942,077; 4,967,085; 4,998,568; 5,016,678; 5,054,525; 5,066,532; 5,098,519; 5,103,874; 5,114,777; 5,167,261; 5,199,261; 5,199,467; 5,211,815; 5,219,004; 5,245,025; 5,277,761; 5,328,565; and 5,379,808, all of which are incorporated herein by reference in their entireties. One forming fabric particularly useful with the present invention is Voith Fabrics Forming Fabric 2164 made by Voith Fabrics Corporation, Shreveport, La.

Foam-forming of the aqueous furnish on a forming wire or fabric may be employed as a means for controlling the permeability or void volume of the sheet upon wet-creping. Suitable foam-forming techniques are disclosed in U.S. Pat. No. 4,543,156 and Canadian Patent No. 2,053,505, the disclosures of which are incorporated herein by reference in their entireties.

In accordance with the present invention, creping of the paper from a Yankee dryer may be carried out using an undulatory creping blade, such as that disclosed in U.S. Pat. No. 5,690,788, the disclosure of which is incorporated herein by reference in its entirety. Use of the undulatory crepe blade has been shown to impart several qualities when used in production of tissue products. In general, tissue products creped using an undulatory blade tend to at least have higher caliper (thickness), increased CD stretch, and/or a higher void volume than do comparable tissue products produced using conventional crepe blades. All of these changes effected by use of the undulatory blade tend to correlate with improved softness perception of the tissue products.

The undulatory creping blade, as shown as blade 70 in FIG. 1, for example, may have from about 4 to about 50 ridges per inch in the machine direction and from about 8 to about 150 crepe bars per inch in the cross-direction. In one embodiment, the creping blade may have about 8 to about 20 ridges per inch in the machine direction. The blade may have a tooth depth of from about 5 to about 50 mils. In one embodiment, the blade may have a tooth depth of from about 15 mils to about 40 mils. In yet another embodiment, the blade may have a tooth depth of from about 25 to about 35 mils.

FIGS. 3A through 3D illustrate a portion of an undulatory creping blade 70 available for use in the practice of the present invention in which a relief surface 72 extends indefinitely in length, typically exceeding 100 inches in length and often reaching over 26 feet in length to correspond to the width of the Yankee dryer on the larger modern paper machines. Flexible blades of the undulatory blade having indefinite length can suitably be placed on a spool and used on machines employing a continuous creping system. In such cases the blade length would be several times the width of the Yankee dryer. In contrast, the height of the blade 70 is usually on the order of several inches while the thickness of the body is usually on the order of fractions of an inch.

Figure 2:
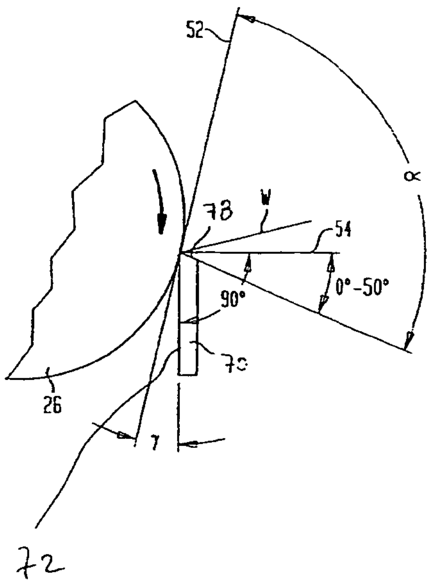
FIG. 2 is a schematic diagram illustrating various characteristic angles of a creping process.

As illustrated in FIGS. 3A through 3D, an undulatory cutting edge 73 of the undulatory blade may be defined by serrulations 76 disposed along, and formed in, one edge of the surface 72 so as to define an undulatory engagement surface. Cutting edge 73 may be configured and dimensioned so as to be in continuous undulatory engagement with Yankee 26 when positioned as shown in FIG. 2. That is, the blade may continuously contact the Yankee cylinder in a sinuous line generally parallel to the axis of the Yankee cylinder. In some embodiments, there is a continuous undulatory engagement surface 80 having a plurality of substantially co-linear rectilinear elongate regions 82 adjacent a plurality of crescent shaped regions 84 about a foot 86 located at the upper portion of the side 88 of the blade which is disposed adjacent the Yankee. The undulatory surface 80 may thus be configured to be in continuous surface-to-surface contact over the width of a Yankee cylinder when in use as shown in FIGS. 1 and 2 in an undulatory or sinuous wave-like pattern.

The number of teeth per inch may be taken as the number of elongate regions 82 per inch and the tooth depth may be taken as the height, H, of the groove indicated at 81 adjacent surface 88.

Several angles are used in order to describe the geometry of the cutting edge of the undulatory blade. To that end, the following terms are used:

Creping angle "α"—the angle between the line of contact of a rake surface 78 of the blade 70 and the plane 52 tangent to the Yankee at the point of intersection between the undulatory cutting edge 73 and the Yankee.

Axial rake angle "β"—the angle between the axis of the Yankee and the undulatory cutting edge 73 which is the curve defined by the intersection of the surface of the Yankee with indented rake surface of the blade 70.

Relief angle "γ"—the angle between the relief surface 72 of the blade 70 and the plane 52 tangent to the Yankee at the intersection between the Yankee and the undulatory cutting edge 73, the relief angle measured along the flat portions of the present blade is equal to what is commonly called "blade angle" or "holder angle", that is, "γ" in FIG. 2.

Blade bevel angle—the angle the rake surface 78 defines with a perpendicular 54 to the blade body.

Based on the above terms, and referring to FIG. 2, the creping angle may be readily calculated from the formula:

$$\alpha = 90 + \text{blade bevel angle} - \gamma.$$

While the creping angle for a conventional blade will be constant over the entire creping surface, these parameters vary over the creping surface of an undulatory blade.

The value of each of these angles may vary depending upon the precise location along the cutting edge at which it is to be determined. The remarkable results achieved with the described undulatory blades in the manufacture of the absorbent paper products are due to those variations in these angles along the cutting edge. Accordingly, in many cases it will be convenient to denote the location at which each of these angles is determined by a subscript attached to the basic symbol for that angle. As noted in the '788 patent, the subscripts "f," "c," and "m" refer to angles measured at the rectilinear elongate regions, at the crescent shaped regions, and the minima of the cutting edge, respectively. Accordingly, "$\gamma_f$", the relief angle measured along the flat portions of the present blade, is equal to what is commonly called "blade angle" or "holder angle." In general, it will be appreciated that the pocket angle $\alpha_f$ at the rectilinear elongate regions is typically higher than the pocket angle $\alpha_c$ at the crescent shaped regions.

While the products of the invention may be made by way of a dry-crepe process, they may also be made by way of a wet-crepe process, and in one embodiment with respect to a single ply towel. When a wet-crepe process is employed, the after-drying section, for example that of after-drying section 30 in FIG. 1, may include an impingement air dryer, a through-air-dryer, a Yankee dryer, or a plurality of can dryers. Impingement air dryers are disclosed in U.S. Pat. Nos. 5,865,955, 5,968,590, 6,001,421, and 6,432,267, the disclosures of which are incorporated herein by reference in their entireties.

Figure 4:
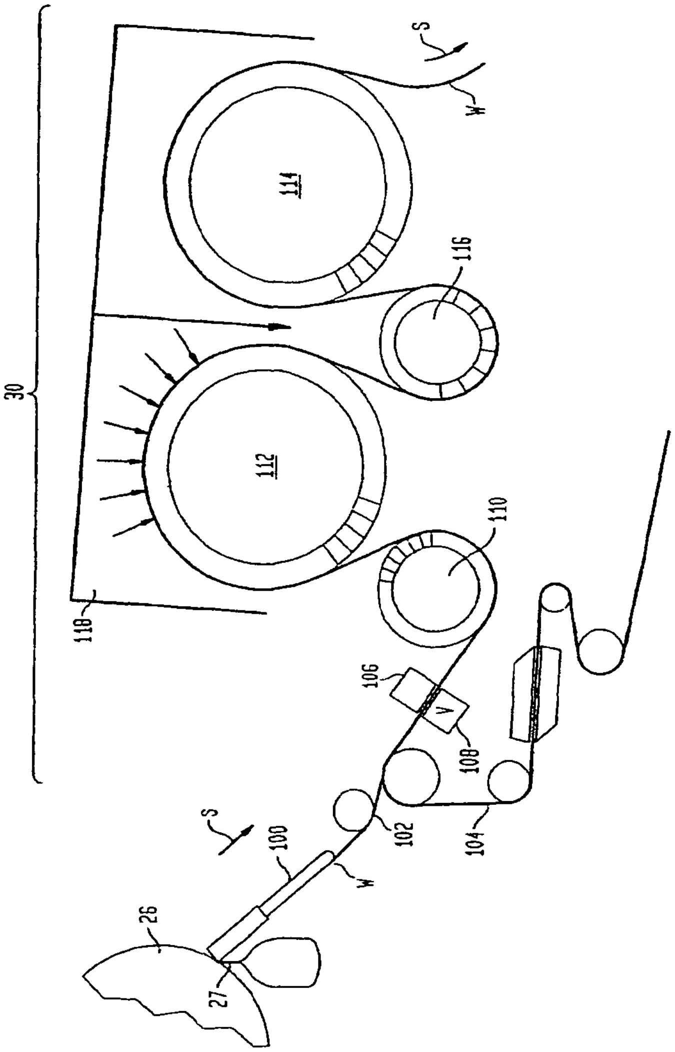
FIG. 4 is a schematic diagram of an impingement air drying section of a paper machine used to dry a wet-creped web.

When an impingement air after dryer is used, in one embodiment the after drying section 30 of FIG. 1 may have the configuration shown in FIG. 4.

There is shown in FIG. 4 an impingement air dryer apparatus 30 in connection with one embodiment of the present invention. The web may be creped off of a dryer, such as the Yankee dryer 26 of FIG. 1 utilizing a creping blade 70. The web W is aerodynamically stabilized over an open draw utilizing an air foil 100 as generally described in U.S. Pat. No. 5,891,309, the disclosure of which is incorporated herein by reference in its entirety. Following a transfer roll 102, the web W is disposed on a transfer fabric 104 and subjected to wet shaping by way of an optional blow box 106 and vacuum shoe 108. The particular conditions and impression fabric selected depend on the product desired and may include conditions and fabrics described above or those described or shown in one or more of U.S. Pat. Nos. 5,510,002, 4,529,480, 4,102,737, and 3,994,771, the disclosures of which are hereby incorporated by reference in their entireties.

After wet shaping, the web W may be transferred over the vacuum roll 110 impingement air-dry system as shown. The apparatus of FIG. 4 may generally include a pair of drilled hollow cylinders 112, 114, a vacuum roll 116 therebetween, as well as a hood 118 equipped with nozzles and air returns. In connection with FIG. 4, it should be noted that transfer of a web W over an open draw needs to be stabilized at high speeds. Rather than use an impingement-air dryer, the after-dryer section 30 of FIG. 4 may include, instead of cylinders 112, 114, a through-air-drying unit, as is well known in the art and described in U.S. Pat. No. 3,432,936, the disclosure of which is incorporated herein by reference in its entirety.

Yet another after-drying section is disclosed in U.S. Pat. No. 5,851,353, which is incorporated by reference herein in its entirety and which may likewise be employed in a wet-creped process using the apparatus of FIG. 1.

Figure 5:
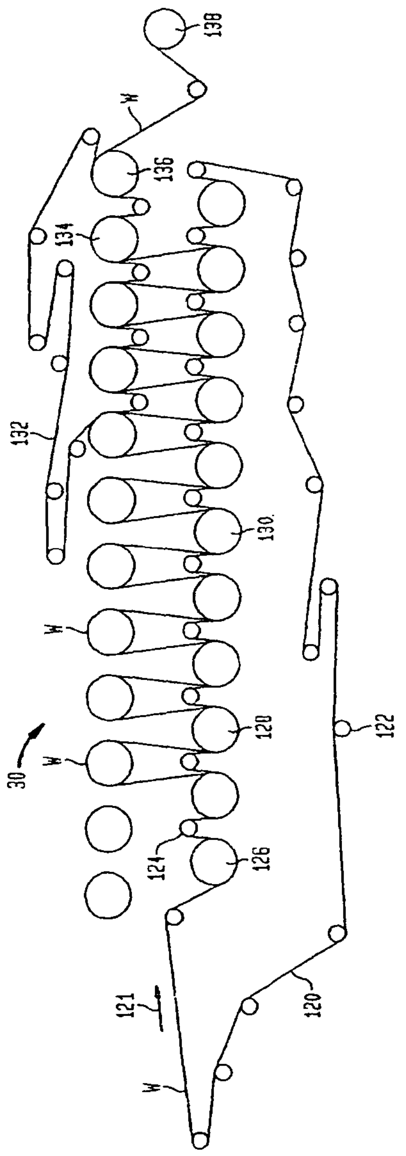
FIG. 5 is a schematic diagram of a can drying section of a paper machine used to dry a wet-creped web.

Still yet another after-drying section 30 is illustrated schematically in FIG. 5. After creping from the Yankee cylinder, the web W may be deposited on an after-dryer felt 120 which travels in direction 121 and forms an endless loop about a plurality of after-dryer felt rolls such as rolls 122, 124 and a plurality of after-dryer drums such as drums (sometimes referred to as cans) 126, 128, and 130.

A second felt 132 may likewise form an endless loop about a plurality of after-dryer drums and rollers as shown. The various drums may be arranged in two rows as shown and the web may be dried as it travels over the drums of both rows and between rows as shown in the diagram. The second felt 132 carries the web W from drum 134 to drum 136, from which the web W may be further processed or wound up on a take-up reel 138.

Figure 6:
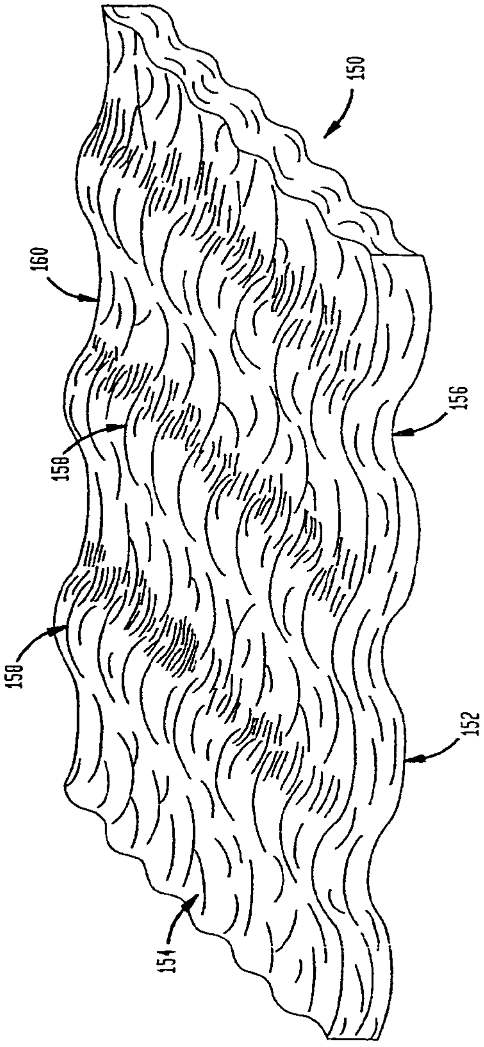
FIG. 6 is a schematic view of a biaxially undulatory product prepared in accordance with the present invention.

In another embodiment of the present invention, the web may be a creped or recreped web as depicted in FIG. 6, comprising a biaxially undulatory cellulosic fibrous web 150 creped from a Yankee dryer 26 such as shown in FIGS. 1 and 2. The creped or recreped web may be characterized by a reticulum of intersecting crepe bars 154, and undulations defining ridges 152 on the air side thereof, the crepe bars 154 extending transversely in the cross machine direction, the ridges 152 extending longitudinally in the machine direction. The web 150 also has furrows 156 between ridges 152 on the air side, as well as crests 158 disposed on the Yankee side of the web opposite furrows 156 and sulcations 160 interspersed between crests 158 and opposite to the ridges 152, wherein the spatial frequency of said transversely extending crepe bars 154 may be from about 10 to about 150 crepe bars per inch, and the spatial frequency of said longitudinally extending ridges 152 may be from about 4 to about 50 ridges per inch. It should be understood that strong calendaring of the sheet made with this invention can reduce the height of the ridges 152, in some instances making them difficult to perceive by the eye, without loss of the beneficial effects of this invention.

The crepe frequency count for a creped base sheet or product may be measured with the aid of a microscope. For Example, the Leica Stereozoom™ 4 microscope has been found to be suitable for this procedure. The sheet sample is placed on the microscope stage with its Yankee side up and the cross direction of the sheet vertical in the field of view. Placing the sample over a black background improves the crepe definition. During the procurement and mounting of the sample, care should be taken that the sample is not stretched. Using a total magnification of 18-20, the microscope is then focused on the sheet. An illumination source is placed on either the right or left side of the microscope stage, with the position of the source being adjusted so that the light from it strikes the sample at an angle of approximately 45 degrees. It has been found that Leica or Nicholas Illuminators are suitable light sources. After the sample has been mounted and illuminated, the crepe bars are counted by placing a scale horizontally in the field of view and counting the crepe bars that touch the scale over a one-half centimeter distance. This procedure is repeated at least two times using different areas of the sample. The values obtained in the counts are then averaged and multiplied by the appropriate conversion factor to obtain the crepe frequency in the desired unit length.

It should be noted that the thickness of the portion of the web 150 between the longitudinally extending crests 158 and the furrows 156 may, on average, typically be about 5% greater than the thickness of portions of the web 150 between the ridges 152 and the sulcations 160. Suitably, the portions of the web 150 adjacent the longitudinally extending ridges 152 (on the air side) are in the range of from about 1% to about 7% thinner than the thickness of the portion of the web 150 adjacent to the furrows 156 as defined on the air side of the web 150.

The height of the ridges 152 correlates with the tooth depth H formed in the undulatory creping blade 70. At a tooth depth of about 0.010 inches, the ridge height is usually from about 0.0007 to about 0.003 inches for sheets having a basis weight of about 14 to about 19 pounds per ream. At double the depth, the ridge height increases to from about 0.005 to about 0.008 inches. At tooth depths of about 0.030 inches, the ridge height is from about 0.010 to about 0.013 inches. At higher undulatory depths, the height of the ridges 152 may not increase and may decrease. The height of the ridges 152 also depends on the basis weight of the sheet and strength of the sheet.

The average thickness of the portion of the web 150 adjoining the crests 158 may be significantly greater than the thickness of the portions of the web 150 adjoining the sulcations 160. Thus, the density of the portion of the web 150 adjacent the crests 158 can be less than the density of the portion of the web 150 adjacent the sulcations 160. The process of the present invention may produce a web having a specific caliper of from about 2 to about 8 mils per 8 sheets per pound of basis weight. The usual basis weight of the web 150 is from about 7 to about 35 lbs/3000 sq. ft. ream.

Suitably, when the web 150 is calendared, the specific caliper of the web 150 may be from about 2.0 to about 6.0 mils, per 8 sheets per pound of basis weight, and the basis weight of the web may be from about 7 to about 35 lbs/3000 sq. ft. ream. In one embodiment, the caliper of the sheet of the invention may be at least about 7.5% greater than that of a like or equivalent sheet prepared without the use of an undulatory creping blade or at least about 5% more than that of a sheet made without high coarseness tubular fibers creped with an equivalent undulatory creping blade. Calipers reported herein are 8 sheet calipers unless otherwise indicated. Thus, eight sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with 2-in (50.8-mm) diameter anvils, 539±10 grams dead weight load, and 0.231 in/sec descent rate. For finished product testing, each sheet of product to be tested must have the same number of plies as the product to be sold. For napkin testing, the napkins are completely unfolded prior to stacking. For base sheet testing off of winders, each sheet to be tested must have the same number of plies as produced off the winder. For base sheet testing off of the paper machine reel, single plies are used.

In one embodiment, the invention is directed to a creped absorbent cellulosic sheet incorporating from about 15% to about 40% by weight of high coarseness, generally tubular and lignin-rich cellulosic fiber based on the weight of cellulosic fiber in the sheet prepared by way of a process comprising applying a dewatered web to a heated rotating cylinder and creping the web from the heated rotating cylinder with an undulatory creping blade. When a lignin-rich, high coarseness and generally tubular cellulosic fiber is used, it may comprise at least about 10% by weight lignin based on the weight of the lignin-rich cellulosic fiber. In one embodiment, the lignin-rich, high coarseness and generally tubular cellulosic fiber may comprise at least about 15% by weight lignin based on the weight of the lignin-rich cellulosic fiber. In another embodiment, the lignin-rich, high coarseness and generally tubular cellulosic fiber may comprise at least about 25% by weight lignin based on the weight of the lignin-rich cellulosic fiber. In a further embodiment, the lignin-rich, high coarseness generally tubular fiber comprises from about 25% to about 35% by weight lignin based on the weight of the lignin-rich, high coarseness and generally tubular cellulosic fiber in the sheet. The lignin-rich, high coarseness and generally tubular fiber may have an average fiber length of at least about 2.25 mm and the fiber length may be from about 2.25 to about 2.75 mm. According to one embodiment, the coarseness can be from about 20 to about 30 mg/100 m.

The water absorbent capacity (WAC) of the sheet of the present invention may be at least about 5% greater than that of a like or equivalent sheet prepared without the use of an undulatory creping blade or at least 5% more than that of a sheet made without high coarseness tubular fibers creped with an equivalent undulatory blade. WAC is defined as the point where the weight versus time graph has a "zero" slope, i.e., the sample has stopped absorbing. In one embodiment, the WAC of the product may be greater than about 170 $g/m^2$.

The WAC of the products of the present invention may be measured with a simple absorbency tester. The simple absorbency tester may also be a useful apparatus for measuring the hydrophilicity and absorbency properties of a sample of tissue, napkins, or towel. In this test a sample of tissue, napkins, or towel 2.0 inches in diameter is mounted between a top flat plastic cover and a bottom grooved sample plate. The tissue, napkins, or towel sample disc is held in place by a ⅛ inch wide circumference flange area. The sample is not compressed by the holder. De-ionized water at 73° F. is introduced to the sample at the center of the bottom sample plate through a 1 mm diameter conduit. This water is at a hydrostatic head of minus 5 mm. Flow is initiated by a pulse introduced at the start of the measurement by the instrument mechanism. Water is thus imbibed by the tissue, napkin, or towel sample from this central entrance point radially outward by capillary action. When the rate of water imbibation decreases below 0.005 gm water per 5 seconds, the test is terminated. The amount of water removed from the reservoir and absorbed by the sample is weighed and reported as grams of water per square meter of sample.

A Gravimetric Absorbency Testing System may be used to determine WAC, which is obtainable from M/K Systems Inc., Danvers, Mass. WAC is actually determined by the instrument itself. The termination criteria for a test are expressed in maximum change in water weight absorbed over a fixed time period. This is basically an estimate of zero slope on the weight versus time graph. The program uses a change of 0.005 g over a 5 second time interval as termination criteria.

A series of one-ply wet-creped towels were prepared as indicated in Table 2 below.

TABLE 2

| Absorbency/Caliper Synergy | | | | | | | |
|---|---|---|---|---|---|---|---|
| | Example A | Example B | Example C | Example 1 | Example D | Example 2 | Example E |
| Creping Blade | square | 12 tpi/0.030" | square | 12 tpi/0.030" | 12 tpi/0.030" | 12 tpi/0.030" | 12 tpi/0.030" |
| BCTMP (%) | 0 | 0 | 20 | 20 | 30 | 30 | 40 |
| Recycled Fiber (%) | 100 | 100 | 80 | 80 | 70 | 70 | 60 |
| Wet Strength Resin (#T) | optimized | optimized | optimized | optimized | optimized | optimized | optimized |
| CMC | none | none | none | none | none | yes | yes |
| Basis Weight (lbs./ream) | 28.0 | 28.0 | 28.0 | 28.0 | 28.0 | 28.0 | 28.0 |
| The web consistency at the blade is between 60% to 85% | | | | | | | |
| WAC | 137 | 142 | 152 | 162 | 183 | 205 | 215 |
| WAC Synergy (%) | — | — | — | 100 | — | 340 | — |
| Caliper | 44.8 | 51.0 | 48.6 | 57.0 | 61.1 | 68.6 | 70.0 |
| Caliper Synergy (%) | — | — | — | 35 | — | 21 | — |

As will be appreciated from Table 2, the use of BCTMP together with an undulatory creping blade of 12 tpi, 30 mil tooth depth exhibited synergy. Data for the towels also appears plotted on FIGS. 8 through 10. "TPI" as used herein stands for "teeth per inch."

Figure 8:
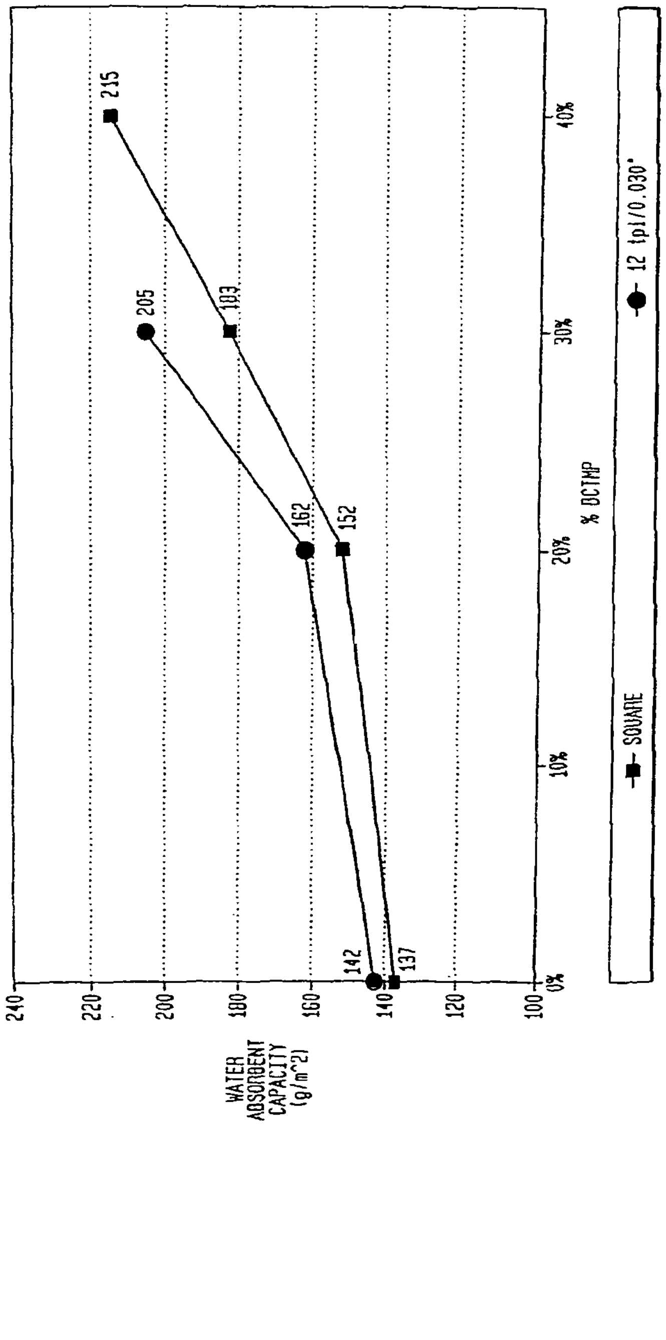
FIG. 8 is a plot of water absorbent capacity versus BCTMP content for various products made using a wet-crepe process.
Figure 9:
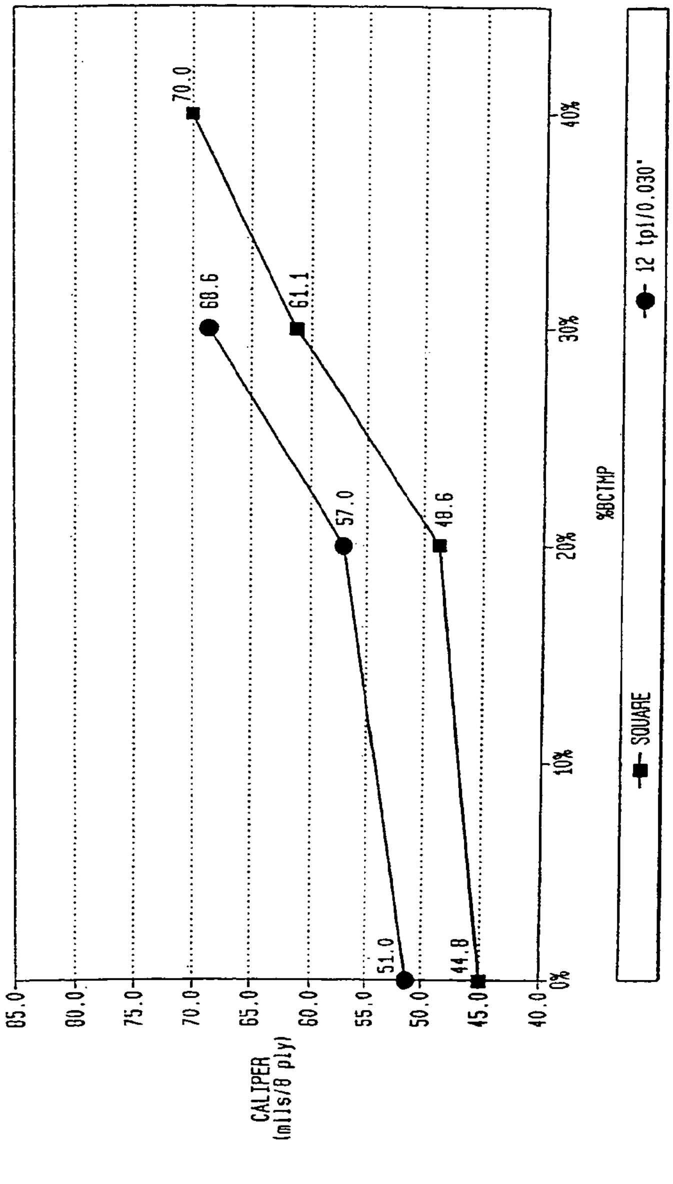
FIG. 9 is a plot of caliper versus BCTMP content for various wet-creped products.
Figure 10:
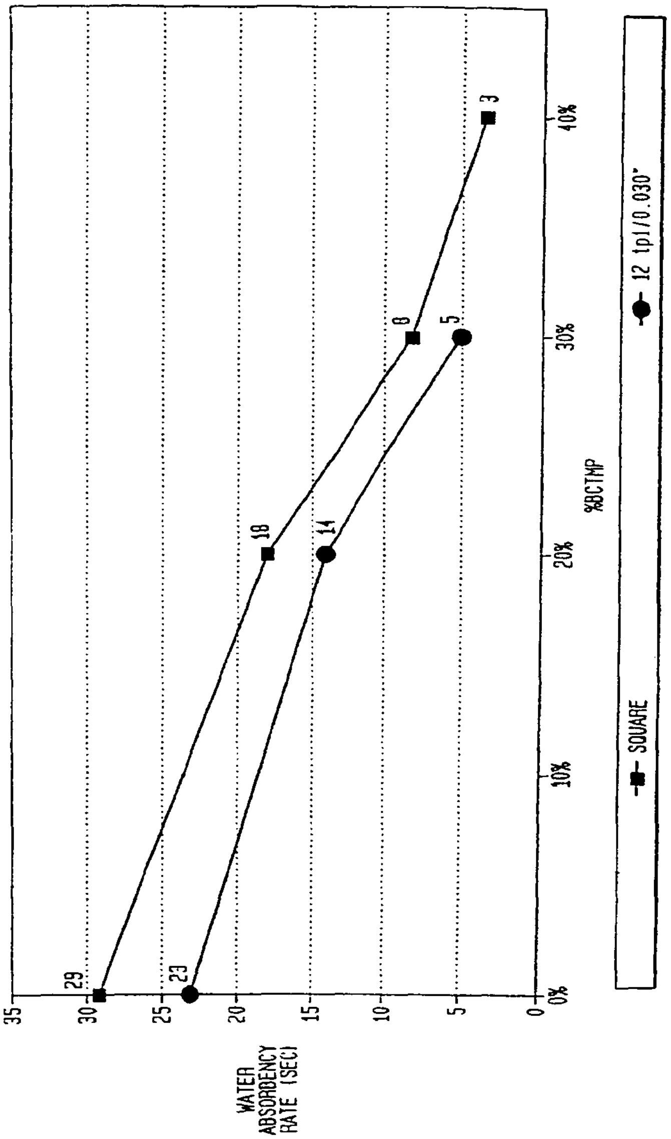
FIG. 10 is a plot of water absorbency rate versus BCTMP content for various wet-creped products.

The synergies are calculated based on Examples A and B, as well as measurements based on a sheet made from the same composition in terms of fiber and the same approximate basis weight. In the first step in calculating the percent synergy, the expected creping blade delta is calculated as the difference between examples A and B. For example, a 142-137 or 5 g/m$^2$ increase in WAC is expected based on the use of an undulatory blade. Next, the synergy is calculated as the difference between the observed value and the expected value divided by the expected delta times 100%. For WAC in Example 1, this calculates as: (162−(152+5))/5×100% or 100% greater than the expected increase based on additive effects. As can be seen from Table 2, large absorbency synergies as well as significant caliper increases may be achieved in accordance with the invention. Likewise, products made with BCTMP and an undulatory creping blade exhibit remarkable increases in water absorbency rates (WAR). The differences seen in Table 2 and FIGS. 8 through 10 are consistent with the observed increase in void volume or increase in bulk as can be seen in FIGS. 11A and 11B. FIG. 11A is a photomicrograph of a creped towel including only conventional fiber along the cross-machine direction, whereas FIG. 11B is a photomicrograph of a creped towel along the cross-machine direction prepared in accordance with the invention including 40% BCTMP. As will be appreciated from these figures, the BCTMP containing towel exhibits much more delamination than the towel prepared with only conventional fiber.

In another embodiment of the present invention, the sheet may be embossed with a plurality of embossing patterns having their major axes generally along the cross-machine direction of the sheet. Embossed products may include perforate embossed products with a transluminance ratio (hereinafter defined) of at least about 1.005. The embossed products may have a dry MD/CD tensile ratio of less than about 2. In one embodiment, the dry MD/CD tensile ratio may be less than about 1.5. Cross-machine direction perforate embossing systems are described in U.S. Pat. No. 6,733,626 and U.S. patent application Ser. No. 10/236,993, each of which is incorporated herein by reference in its entirety.

In one embodiment, the converting process may include an embossing system of at least two embossing rolls, the embossing rolls defining at least one nip through which a web to be embossed is passed. The embossing elements may be patterned to create perforations in the web as it is passed through the nip.

Figure 16:
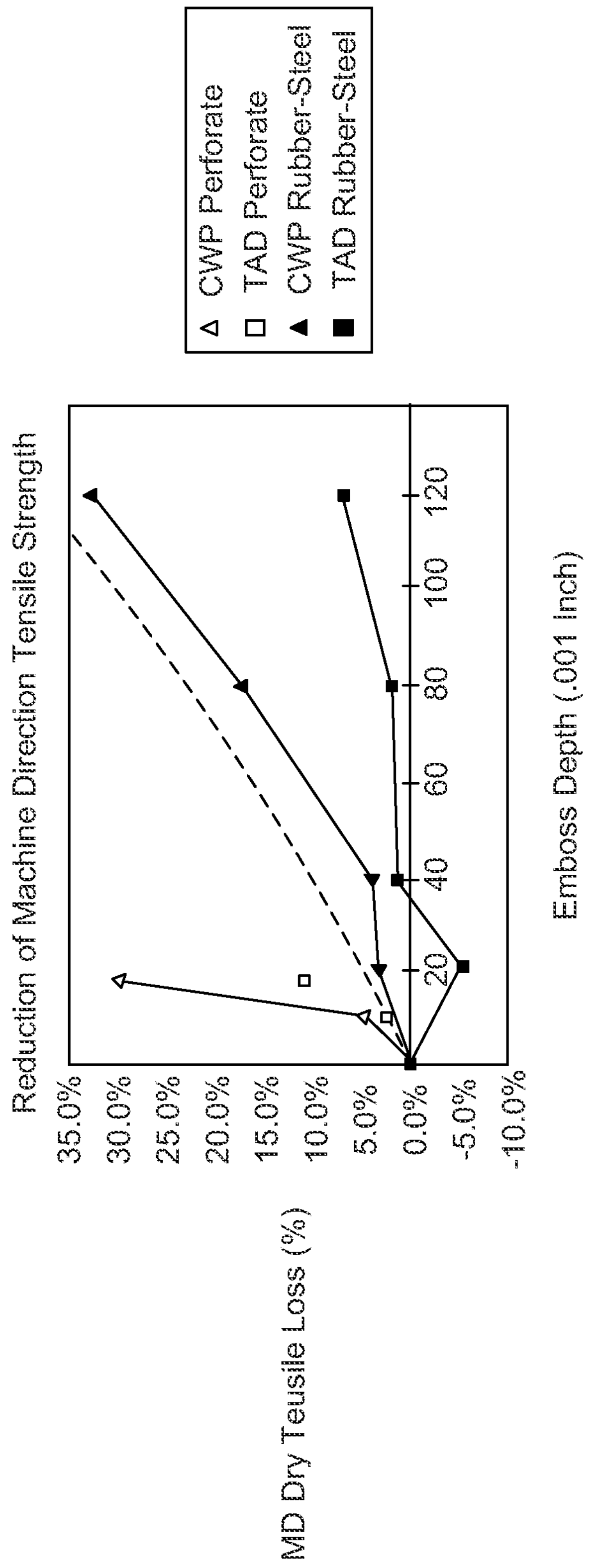
FIG. 16 is a graph illustrating the reduction in machine direction tensile strength according to an embodiment of the present invention.

Generally, for purposes of this invention, perforations are created when the strength of the web is locally degraded between two bypassing embossing elements resulting in either (1) a macro scale through-aperture, (2) in those cases where a macro scale through-aperture is not present, at least incipient tearing, where such tearing would increase the transmittivity of light through a small region of the web, or (3) a decrease the machine direction strength of a web by at least 15% for a given range of embossing depths. FIG. 16 depicts a comparison of the effects on reduction of strength in the machine direction when perforate embossing a web, as defined herein, and non-perforate embossing a web. In particular, a conventional wet pressed base sheet was perforate embossed between two steel rolls. The same base sheet was non-perforate embossed in a rubber to steel configuration. In addition, a through-air-dried base sheet was also perforate and non-perforate embossed. The reduction in machine direction strength was measured for each of the sheets. The results are plotted on FIG. 16.

As shown in FIG. 16, when non-perforate embossing either a CWP or TAD web to depths of up to 40 mils, the reduction of paper strength in the machine direction was less than 5%. And, when non-perforate embossing either of the CWP or TAD webs at a depth of 80 mils, the reduction of strength of the web was less than 15%. When perforate embossing a web as disclosed in this invention, a greater reduction in strength of the web may be achieved. In the example set forth herein, strength reductions of greater than 15% may be achieved when perforate embossing at depths of at least about 15 mils as compared to rubber to steel embossing, which may result in these strength losses at emboss depths of over 60 mils. According to one embodiment of the present invention, perforation may be specifically defined as locally degrading the strength of the web between two bypassing embossing elements resulting in either (1) the formation of a macro scale through-aperture, (2) when a macro scale through-aperture is not formed, at least incipient tearing, where such tearing would either increase the transmittivity of light through a small region of the web, or (3) a decrease the machine direction strength of a web by at least the percentages set forth in FIG. 16, wherein the "at least" percentages are indicated by the dashed line.

Not being bound by theory, it is believed that the superior strength reduction results achieved using the present invention are due to the location of the local degradation of the web when perforate embossing as compared to when non-perforate embossing. When a web is embossed, either by perforate or non-perforate methods, the portion of the web subject to the perforate or non-perforate nip is degraded. In particular, as a web passes through a non-perforate nip for embossing, the web is stressed between the two embossing surfaces such that the fiber bonds are stretched and sometimes, when the web is over embossed, which is not desired when non-perforate embossing a web, the bonds are torn or broken. When a web is passed through a perforate nip, the web fiber bonds are at least incipiently torn by the stresses caused by the two bypassing perforate elements. As stated above, however, one difference between the two methods appears to be in the location of the at least incipient tearing.

Figure 17A:
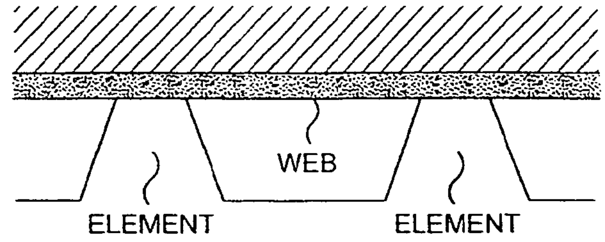
FIGS. 17A-C illustrate the effects of over-embossing a web portion in the machine direction and cross-machine direction when using rigid to resilient embossing, as compared to perforate embossing a web as in FIG. 17D.
Figure 17B:
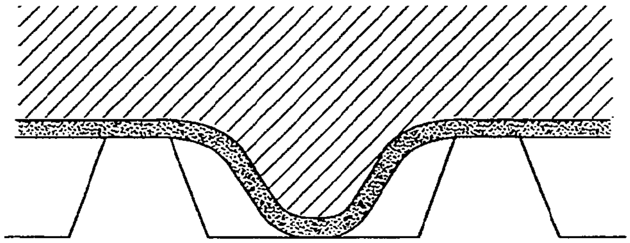
Figure 17C:
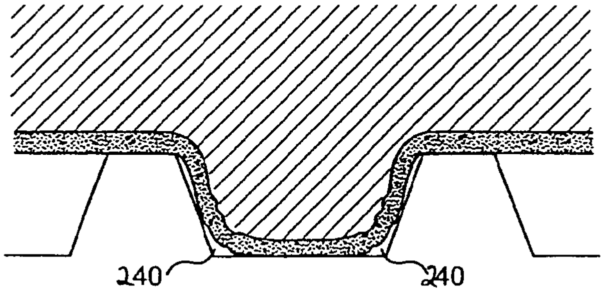

When a web is over-embossed in a rubber to steel configuration, the male steel embossing elements apply pressure to the web and the rubber roll, causing the rubber to deflect away from the pressure, while the rubber also pushes back. As the male embossing elements roll across the rubber roll during the embossing process, the male elements press the web into the rubber roll which causes tension in the web at the area of the web located at the top edges of the deflected rubber roll, i.e., at the areas at the base of the male embossing elements. When the web is over-embossed, tearing can occur at these high-tension areas. More particularly, FIGS. 17A-C depict rubber to steel embossing of a web at various embossing depths. FIG. 17A depicts embossing of a web at approximately 0 mils. In this configuration the rubber roll pins the web at the points where the web contacts the steel roll element tops. Typically no tearing will occur in this configuration. In FIG. 17B, where the embossing depth is approximately the height of the steel embossing element, the web is pinned at the element tops and at a point between the bases of the adjacent steel elements. As with the configuration depicted in FIG. 17A, tearing does not typically occur in this configuration for conventional embossing procedures. FIG. 17C depicts an embossing depth comparable to or greater than the height of the steel element. In this configuration, the "free span" of the web, i.e., the sections of the web that are not pinned between the rubber and steel rolls, becomes shorter as the rubber material fills the area between the adjacent elements. When web rupturing occurs, it tends to occur near the last location where web movement is possible; that is, the area of degradation 240 is the last area that is filled by the rubber material, namely the corners where the bases of the elements meet the surface of the emboss roll.

Figure 17D:
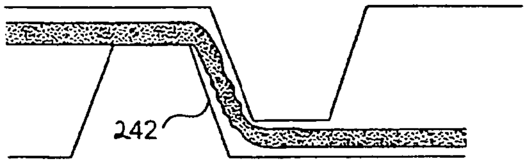

When a web is perforate embossed, on the other hand, the areas of degradation 242, as shown in FIG. 17D, are located along the sides of the perforate embossing element. It appears that as a result of this difference the degradation of the web and the resultant reduction of web strength is dramatically different.

In one embodiment according to the present invention, the embossing rolls capable of imparting a cross-machine direction embossing pattern have substantially identical embossing element patterns, with at least a portion of the embossing elements configured such that they are capable of producing perforating nips which are capable of perforating the web. As the web is passed through the nip, an embossing pattern is imparted on the web. In one embodiment, the embossing rolls may be either steel, hard rubber, or other suitable polymer. In another embodiment, the embossing elements are mated. The direction of the web as it passes through the nip is referred to as the machine direction. The transverse direction of the web that spans the emboss roll is referred to as the cross-machine direction. In one embodiment, a predominant number, i.e., at least about 50% or more, of the perforations are configured to be oriented such that the major axis of the perforation is substantially oriented in the cross-machine direction. As used herein, an embossing element is substantially oriented in the cross-machine direction when the long axis of the perforation nip formed by the embossing element is at an angle of from about 60° to about 120° from the machine direction of the web. As used herein, an embossing element is substantially oriented in the machine direction when the long axis of the perforation nip formed by the embossing element is at angle outside of from about 60° to about 120° from the machine direction of the web.

In an embodiment according to the present invention, and as shown in FIG. 18A, the converting process includes an embossing system 220 of two embossing rolls 222 defining a nip 228 through which the web 232 to be embossed is passed. According to one embodiment, the embossing rolls 222 are matched or mated embossing rolls. The embossing rolls can be, for example, either steel, hard rubber, or other suitable polymer. The embossing rolls 222 may have at least a portion of embossing elements 234 oriented such that the major axis of the elements 234 is in the cross-machine direction, i.e., the elements are in the cross-machine direction. It is possible to envisage configurations in which perforations extending in the cross-machine direction are formed by elements which are longer in the machine direction; however, such a configuration could possibly compromise the overall number of perforations which could be formed in the web. Accordingly, elements are discussed as oriented in the cross-machine direction, it is in reference to elements that are configured such that the orientation of the perforation formed by those elements extends in the cross-machine direction, irrespective of the shape of the remainder of the element not contributing to the shape of the nip, whether the element be male or female. While the embossing rolls 222 for imparting a cross-machine direction embossing pattern may also have embossing elements oriented such that the major axis of the elements is in the machine direction, a predominant number, i.e., at least about 50% or more, of the elements 234 may be oriented such that they are capable of producing perforating nips or perforate emboss extending in the cross-machine direction. In another embodiment, substantially all, i.e., at least more than about 75%, of the elements 234 are oriented such that they are capable of producing perforating nips or perforate emboss extending in the cross-machine direction. In yet another embodiment, about 100% or all of the elements are oriented in the cross-machine direction. Moreover, at least about 25% of the cross-machine direction elements may be perforating elements. In one embodiment, about 100% of the cross-machine direction elements are perforating elements. Thus, when the web passes through the embossing rolls 222, at least a portion of the cross-machine direction elements are aligned such that the web is perforated such that at least a portion of the perforations are substantially oriented in the cross-machine direction.

The end product characteristics of a cross-machine direction perforated embossed product can depend upon a variety of factors of the embossing elements that are imparting a pattern on the web. These factors can include one or more of the following: embossing element height, angle, shape, including sidewall angle, spacing, engagement, and alignment, as well as the physical properties of the rolls, base sheet, and other factors. Following is a discussion of a number of these factors.

An individual embossing element 234 has certain physical properties, such as height, angle, and shape, that affect the embossing pattern during an embossing process. Various of these properties are depicted in FIGS. 18B-D. The embossing element can be either a male embossing element or a female embossing element. The height of an element 234 is the distance the element 234 protrudes from the surface of the embossing roll 222. In one embodiment, the cross-machine direction embossing elements 234 have a height of at least about 15 mils. In another embodiment according to the present invention, the cross-machine direction elements 234 have a height of at least about 30 mils. In yet another embodiment of the present invention, the cross-machine direction elements 234 have a height of at least about 45 mils. In still yet another embodiment of the invention, the cross-machine elements 234 have a height of at least about 60 mils. In yet another embodiment, a plurality of the elements 234 on the cross-machine direction embossing roll have at least two regions, having a first region having elements having a first height and at least a second region having elements having a second height. In one embodiment, the elements 234 have a height of between about 30 to about 65 mils. Those of ordinary skill in the art will understand that there are a variety of element heights that can be used, depending upon a variety of factors, such as the type of web being embossed and the desired end product.

The angle of the cross-machine direction elements 234 substantially defines the direction of the degradation of the web due to cross-machine perforate embossing. In one embodiment, when the elements 234 are oriented at an angle of about 90° from the machine direction, i.e., in the absolute cross-machine direction, the perforation of the web may be substantially in the direction of about 90° from the machine direction and, thus, the degradation of web strength is substantially in the machine direction. In another embodiment, when the elements 234 are oriented at an angle from the absolute cross-machine direction, degradation of strength in the machine direction will be less and degradation of strength in the cross-machine direction will be more as compared to a system where the elements 234 are in the absolute cross-machine direction.

The angle of the elements 234 may be selected based on the desired properties of the end product. Thus, the selected angle may be any angle that results in the desired end product. In an embodiment according to the present invention, the cross-machine direction elements 234 are oriented at an angle of at least about 60° from the machine direction of the web and less than about 120° from the machine direction of the web. In another embodiment, the cross-machine direction elements 234 are oriented at an angle from at least about 75° from the machine direction of the web and less than about 105° from the machine direction of the web. In yet another embodiment, the cross-machine direction elements 234 are oriented at an angle from at least about 80° from the machine direction of the web and less than about 100° from the machine direction of the web. In still another embodiment, the cross-machine direction elements 234 are oriented at an angle of about 85° to about 95° from the machine direction.

A variety of element shapes may be successfully used in the present invention for embossing the web in a cross-machine direction. The element shape is the "footprint" of the top surface of the element, as well as the side profile of the element. The elements 234 may have a length (in the cross-machine direction)/width (in the machine direction) (L/W) aspect ratio of at least about 1.0, however the elements 234 may have an aspect ratio of less than about 1.0. In a further embodiment, the aspect ratio may be about 2.0. One element shape that can be used in this invention is a hexagonal element, as depicted in FIG. 19. Another element shape, termed an oval, is depicted in FIG. 20. For oval elements, the ends may have radii of at least about 0.003" and less than about 0.030" for at least the side of the element forming a perforate nip. In one embodiment, the end radii are about 0.0135". Those of ordinary skill in the art will understand that a variety of different embossing element shapes, such as rectangular, can be employed to vary the embossing pattern.

In one embodiment for embossing the web in the cross-machine direction, at least a portion of the elements 234 are beveled. In particular, in one embodiment the ends of a portion of the elements 234 are beveled. Oval elements with beveled edges are depicted in FIG. 18B. By beveling the edges, the disruptions caused by the embossing elements can be better directed in the cross-machine direction, thereby reducing cross-machine direction degradation caused by the unintentional machine direction disruptions. The bevel dimensions may be from at least about 0.010" to at least about 0.025" long in the cross-machine direction and from at least about 0.005" to at least about 0.015" in the z-direction. Other elements, such as hexagonal elements, may be beveled as well.

The cross-machine direction sidewall of the elements 234 defines the cutting edge of the elements 234. According to one embodiment of the present invention, the cross-machine direction sidewalls of the elements 234 are angled. As such, when the cross-machine direction sidewalls are angled, the base of the element 234 has a width that is larger than that of the top of the element. In one embodiment, the cross-machine direction sidewall angle may be less than about 20°. In another embodiment, the cross-machine direction sidewall angle may be less than about 17°. In still another embodiment, the cross-machine direction sidewall angle may be less than about 14°. In still yet another embodiment, the cross-machine direction sidewall angle may be less than about 11°. In various embodiments, the cross-machine direction sidewall angle may be between about 7° and 11°.

When the opposing elements 234 of the embossing rolls are engaged with each other during an embossing process, the effect on the web may be impacted by at least one of element spacing, engagement, and alignment. When perforate embossing, the elements 234 may be spaced such that the clearance between the sidewalls of elements of a pair, i.e., one element 234 from each of the opposing embossing rolls 222, creates a nip that perforates the web as it is passed though the embossing rolls 222. If the clearance between elements 234 on opposing rolls is too great, the desired perforation of the web may not occur. On the other hand, if the clearance between elements 234 is too little, the physical properties of the finished product may be degraded excessively or the embossing elements themselves may be damaged. The required level of engagement of the embossing rolls is a function of at least one of one or more embossing pattern properties (i.e., element array, sidewall angle, and element height) and one or more base sheet properties (i.e., basis weight, caliper, strength, and stretch). The clearances between the sidewalls of the opposing elements of the element pair should be sufficient to avoid interference between the elements. In one embodiment, the minimum clearance is about a large fraction of the thickness of the base sheet. For example, if a conventional wet press (CWP) base sheet having a thickness of 4 mils is being embossed, the clearance may be at least about 2 to about 3 mils. If the base sheet is formed by a process which may result in a web with rather more bulk, such as, for example, a through air dried (TAD) method or by use of an undulatory creping blade, the clearance may desirably be relatively less. Those of ordinary skill in the art will be able to determine the desired element spacing of the present invention based on the factors discussed above using the principles and examples discussed further herein.

As noted above, in one embodiment the height of the cross-machine direction embossing elements 234 may be at least about 30 mils. In another embodiment, the height may be from about 30 to about 65 mils. Engagement, as used herein, is the overlap in the z-direction of the elements from opposing embossing rolls when they are engaged to form a perforating nip. The engagement overlap should be at least 1 mil. In one embodiment, the engagement is at least about 15 mils. In another embodiment, the engagement is at least about 35 mils. In yet another embodiment, the engagement is at least about 45 mils. In yet a further embodiment, the engagement is at least about the depth of a Taurus blade.

In one embodiment, the engagement between the cross-machine direction embossing elements is at least about 15 mils. Various engagements are depicted in FIGS. 21-23. In particular, FIG. 21 depicts a 32 mil engagement. That is, the overlap of the elements, in the z-direction, is 32 mils. The desired engagement may determined by a variety of factors, including element height, element sidewall angle, element spacing, desired effect of the embossing elements on the base sheet, and the base sheet properties, i.e., basis weight, caliper, strength, and stretch. Those of ordinary skill in the art will understand that a variety of engagements can be employed based on the above, as well as other factors. The engagement may be chosen to substantially degrade the machine direction tensile strength of the web. In one embodiment, the engagement may be at least about 5 mils.

In one embodiment, where the element height is about 42.5 mils and the elements have sidewall angles of from about 7° to about 11°, the engagement range between the cross-machine direction embossing elements may be from about 16 to about 32 mils. FIG. 21 depicts a 32 mil engagement, where the element heights are 42.5 mils and the sidewall angles are 7°, 9°, and 11°. It is believed that lower sidewall angles make the process significantly easier to run with more controllability and decreased tendency to "picking."

The element alignment also affects the degradation of the web in the machine and cross-machine directions. Element alignment refers to the alignment in the cross-machine direction within the embossing element pairs when the embossing rolls are engaged. FIG. 24 depicts an embodiment including hexagonal embossing elements having a full step alignment, i.e., where the elements are completely overlapped in the cross-machine direction. FIG. 25 depicts an embodiment wherein hexagonal embossing elements are in half step alignment, i.e., where the elements of each element pair are staggered so that half of the engaged portion of their cross-machine direction dimensions overlap. FIG. 26 depicts an embodiment wherein hexagonal embossing elements are in quarter step alignment, i.e., where the elements of each element pair are staggered so that one quarter of the engaged portion of their cross-machine direction dimensions overlap. The embodiment depicted in FIG. 27 is a staggered array, wherein each element pair is in half step alignment with adjacent element pairs. Those of ordinary skill in the art will understand that a variety of element alignments are available for use with this invention, depending upon preferred embossing patterns, web strength requirements, and other factors.

FIGS. 28-29 depict the effects of various alignments of a hexagonal cross-machine direction element arrangement on a web. In the example depicted in FIG. 28, where the elements are in full step alignment, perforations exist only in the cross-machine direction in the area between the element pairs. However, between the pairs of element pairs, occasional machine direction perforations may be caused. The result is a degradation of strength in both the machine and cross-machine directions. In the example depicted in FIG. 29, the web is embossed by element pairs in half step alignment. In this example, the perforations exist primarily in the cross-machine direction, with some minor perforations caused in the machine-direction. Thus, in FIG. 29, machine direction strength is degraded and cross-machine direction strength is degraded to a lesser extent.

Figure 30A:
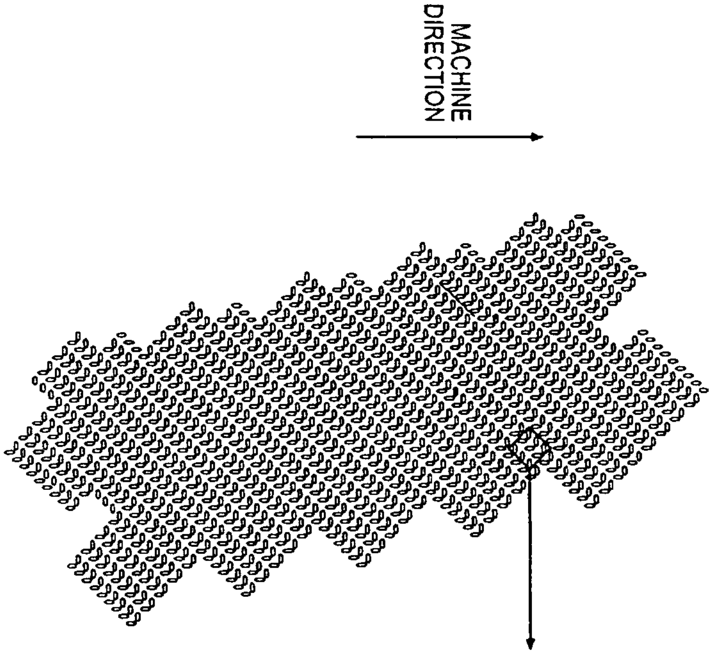
FIGS. 30A-B illustrate an embossing roll having both cross-machine direction and machine direction elements according to an embodiment of the present invention.
Figure 30B:
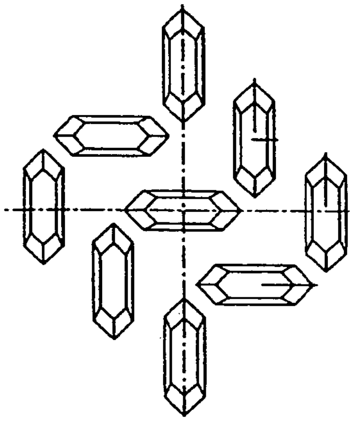

As noted above, the elements can be both in the machine direction and cross-machine direction. FIGS. 30A-B depict an embossing roll having cross-machine direction and machine direction hexagonal elements.

In another embodiment, depicted in FIG. 31, cross-machine direction beveled oval elements are in full step alignment. As with the full step hexagonal elements discussed above, in the area between the element pairs perforations exist primarily in the cross-machine direction. However, between the pairs of element pairs, perforations may be caused in the machine direction. The result is a degradation of strength in both the machine and cross-machine directions. In the embodiment depicted in FIG. 32, on the other hand, where the cross-machine direction beveled oval elements in a half step alignment are employed, the machine direction perforations may be substantially reduced. In particular, between the elements in half step alignment, the perforation lies primarily in the cross-machine direction. Between the element pairs, which are in zero step alignment, primarily pinpoint ruptures exist. These pinpoint ruptures have a minor effect on degradation of the directional properties of the web.

Those of ordinary skill in the art will understand that numerous different configurations of the above described element parameters, i.e., element shape, angle, sidewall angle, spacing, height, engagement, and alignment, may be employed in the present invention. The selection of each of these parameters may depend upon the base sheet used, the desired end product, or a variety of other factors.

One factor that impacts these parameters is "picking" of the web as it is embossed. Picking is the occurrence of fiber being left on an embossing roll or rolls as the web is embossed. Fiber on the roll can diminish the runability of the process for embossing the web, thereby interfering with embossing performance. When the performance of the embossing rolls is diminished to the point that the end product is not acceptable or the rolls are being damaged, it is necessary to stop the embossing process so that the embossing rolls can be cleaned. With any embossing process, there is normally a small amount of fiber left on the roll which does not interfere with the process if the roll is inspected periodically, i.e., weekly, and cleaned, if necessary. For purposes of the invention, picking is defined as the deposition of fiber on a roll or rolls at a rate that would require shut down for cleaning more frequently than once a week.

The following examples exhibit the occurrence of picking observed in certain arrangements of cross-machine direction perforate embossed patterns. This data was generated during trials using steel embossing rolls engraved with the cross-machine direction beveled oval embossing pattern at three different sidewall angles. In particular, the embossing rolls were engraved with three separate regions on the rolls—a 7° sidewall angle, a 9° sidewall angle, and an 11° sidewall angle. Two trials were performed. In the first trial, the embossing rolls had an element height of 45 mils. The base sheet, having a thickness of 6.4 mils, was embossed at engagements of 16, 24, and 32 mils. In the second trial, the steel rolls were modified by grinding 2.5 mils off the tops of the embossing elements, thereby reducing the element height to 42.5 mils and increasing the surface area of the element tops. The base sheet having a thickness of 6.2 mils was embossed at engagements of 16, 24, 28, and 32 mils. For each trial, embossing was performed in both half step and full step alignment.

Figure 33:
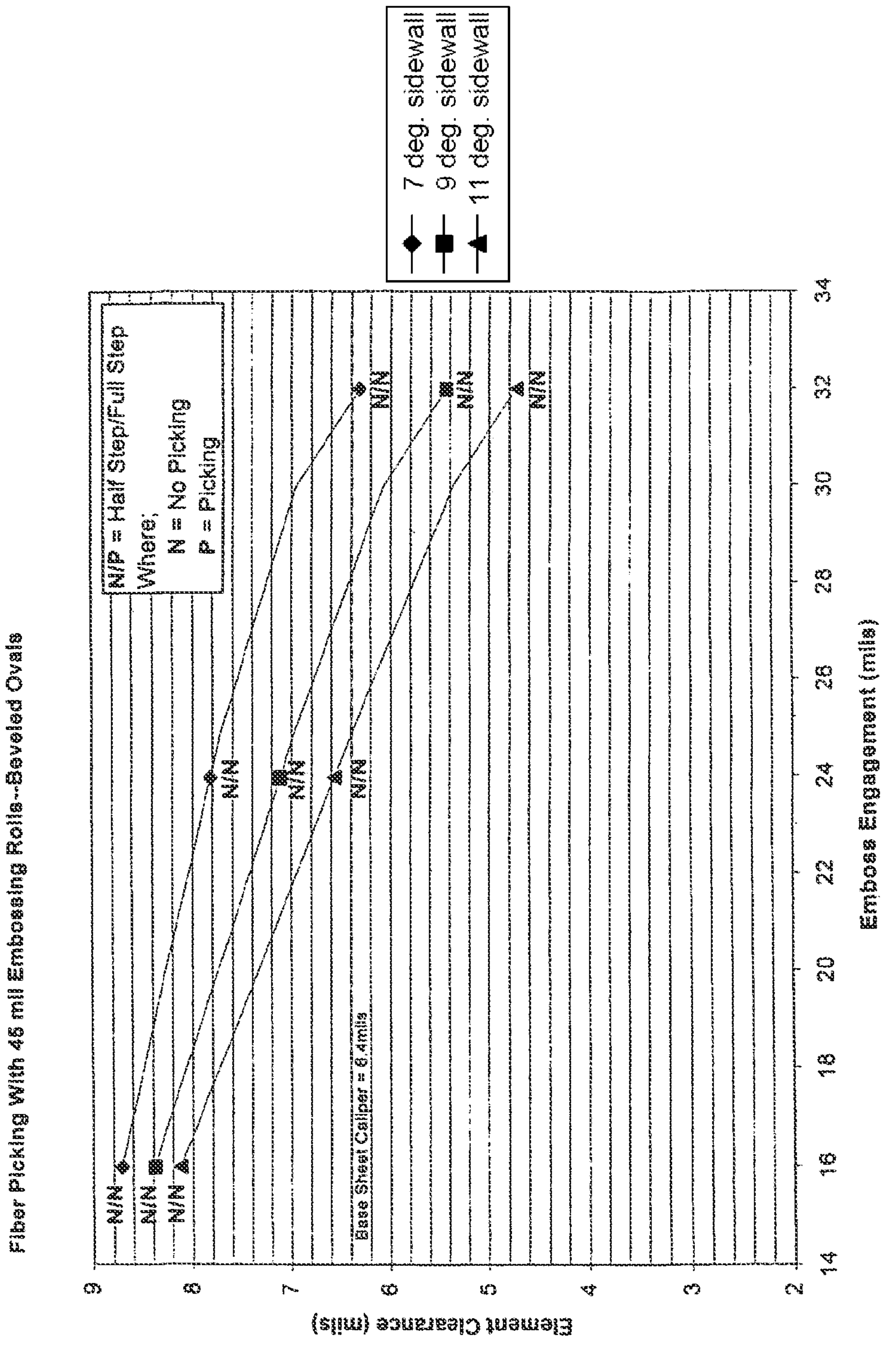
FIG. 33 is a graph illustrating the effect on fiber picking according to several embodiments of the present invention.
Figure 34:
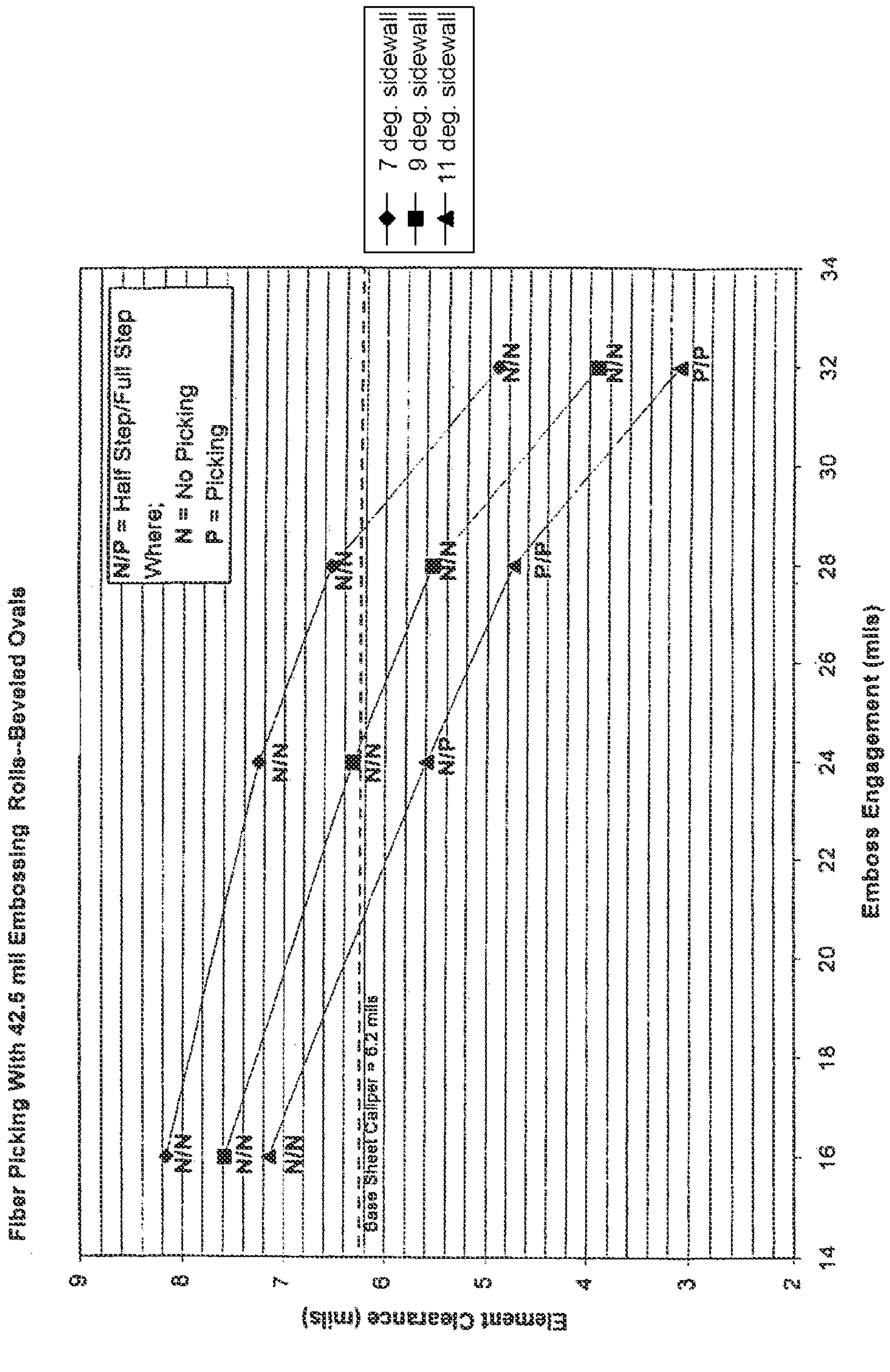
FIG. 34 is a graph illustrating the effect on fiber picking according to several embodiments of the present invention.

The element clearances for each of the sidewall angles of the first and second trials have been plotted against embossing engagement in FIGS. 33 and 34, respectively. The broken horizontal line on each plot indicates the caliper of a single ply of the base sheet that was embossed. The graphs have been annotated to show whether fiber picking was observed at each of the trial conditions (half step observation being to the left of the slash, full step observation to the right). The picking results are depicted in FIGS. 33 and 34.

FIG. 33 shows that for this particular trial using embossing rolls having a 45 mil element height, picking did not occur at any of the sidewall angles. However, as shown in FIG. 34, when the embossing rolls having a 42.5 mil element height were run, fiber picking was observed on the 11° sidewall angle elements at the higher embossing engagements, i.e., 24, 28, and 32 mils. No fiber picking was encountered with elements having sidewall angles of 7° or 9°.

Figure 21A:
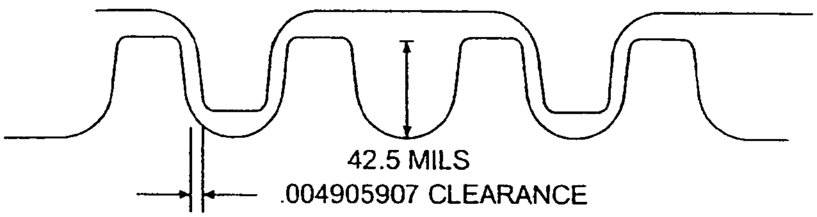
FIGS. 21A-C are side views of the cross-machine direction elements of several embodiments of the present invention having differing wall angles and illustrating the effect of the differing wall angles at an engagement of 0.032".
Figure 21B:
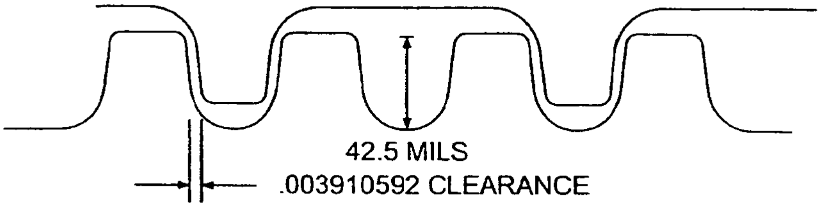
Figure 21C:
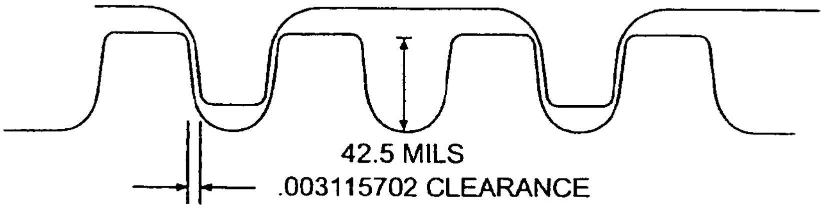

Based on the observed data, it appears that picking is a function of the element height, engagement, spacing, clearance, sidewall angle, alignment, and the particular physical properties of the base sheet, including base sheet caliper. An example of element clearance can be seen in FIGS. 21A-C, where the side profiles of the 42.5 mil elements (having 7°, 9°, and 11° sidewall angles) at 32 mil embossing engagement are shown. Clearance, as used herein, is the distance between adjacent engaging embossing elements. As noted above, the caliper of the embossed sheet for this trial was 6.2 mils. As shown in FIGS. 21A-C, the calculated or theoretical clearance at 7° was 0.004906" (4.906 mils), the clearance at 9° was 0.003911" (3.911 mils), and the clearance at 11° was 0.00311" (3.11 mils). Thus, for this trial at a 32 mil engagement, picking was observed only when the clearance was less than about one-half of the caliper of the sheet.

Figure 22A:
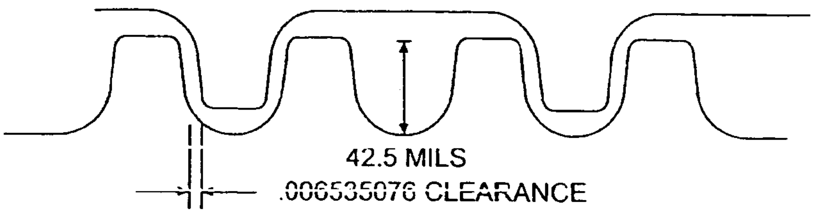
FIGS. 22A-C are side views of the cross-machine direction elements of another several embodiments of the present invention having differing wall angles and illustrating the effect of the differing wall angles at an engagement of 0.028".
Figure 22B:
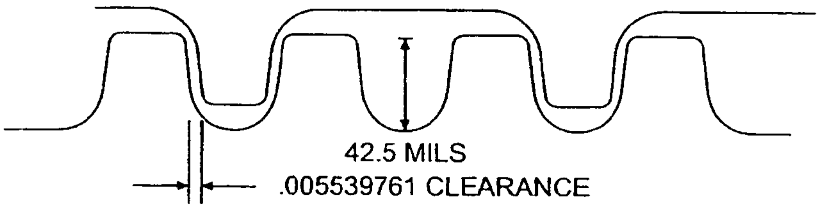
Figure 22C:
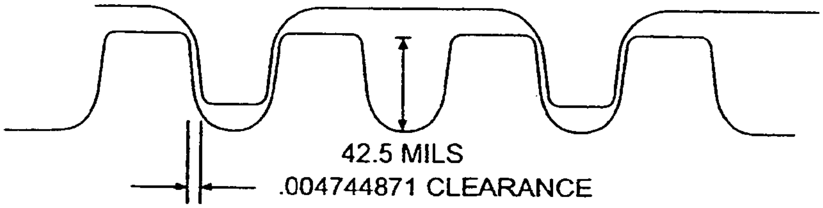
Figure 23A:
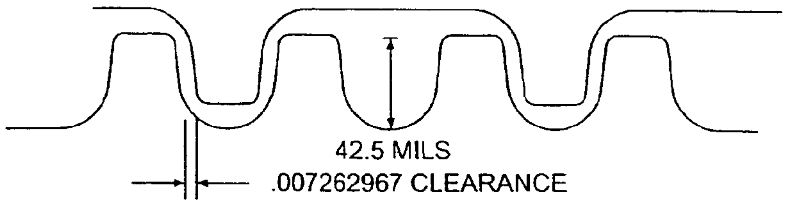
FIGS. 23A-C are side views of the cross-machine direction elements of yet another several embodiments of the present invention having differing wall angles and illustrating the effect of the differing wall angles at an engagement of 0.024".
Figure 23B:
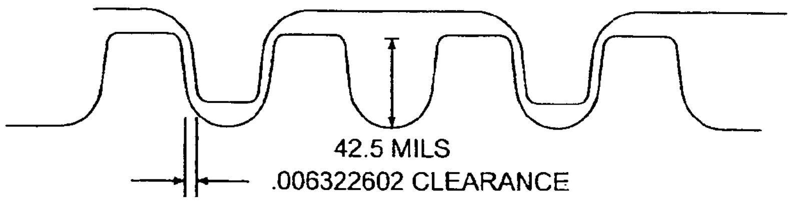
Figure 23C:
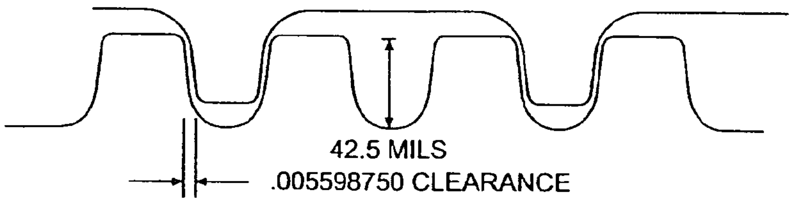

This may be compared to the clearances shown in FIGS. 22A-C. FIGS. 22A-C depict the sidewall profiles of the 42.5 mil elements at 28 mil embossing engagement. In this arrangement, the calculated or theoretical clearance at 7° was 0.006535" (6.535 mils), the clearance at 9° was 0.005540" (5.540 mils), and the clearance at 11° was 0.004745" (4.745 mils). In this trial, picking was observed when the clearance was less than about ¾ of the caliper of the sheet. Note, however, that when embossing at 32 mils, as described above, picking did not occur at 9°, while the clearance was less than 4.745 mils. FIGS. 23A-C depict the sidewall profiles of the 42.5 mil elements at 24 mil engagement. In this arrangement, the clearance at 11° was 0.005599" (5.599 mils), slightly less than the caliper of the sheet. As shown on the graph in FIG. 33, picking did occur for these elements, but only when the elements were in full step alignment and not when in half step alignment. And, as shown in the graph in FIG. 34, picking did not occur at all, at any angle, engagement, or alignment, for the 45 mil embossing rolls.

Thus, based on the collected data, picking may be controlled by varying element height, engagement, spacing, clearance, alignment, sidewall angle, roll condition, and the physical properties of the base sheet. Based upon the exemplified information, those of ordinary skill in the art will understand the effects of the various parameters and will be able to determine the various arrangements that will at least achieve a non-picking operation, i.e., the configuration required to avoid an unacceptable amount of picking based on the factors discussed above, and, hence, produce acceptable paper products with a process that does not require excessive downtime for roll cleaning.

To establish the effectiveness of the various element patterns in perforating the web in the cross-machine direction, and thereby degrading machine direction strength while maintaining cross-machine direction strength, a test was developed, the transluminance test, to quantify a characteristic of perforated embossed webs that is readily observed with the human eye. A perforated embossed web that is positioned over a light source will exhibit pinpoints of light in transmission when viewed at a low angle and from certain directions. The direction from which the sample must be viewed, i.e., machine direction or cross-machine direction, in order to see the light, is dependant upon the orientation of the embossing elements. Machine direction oriented embossing elements tend to generate machine direction ruptures in the web which can be primarily seen when viewing the web in the cross-machine direction. Cross-machine direction oriented embossing elements, on the other hand, tend to generate cross-machine direction ruptures in the web which can be seen primarily when viewing the web in the machine direction.

Figure 35:
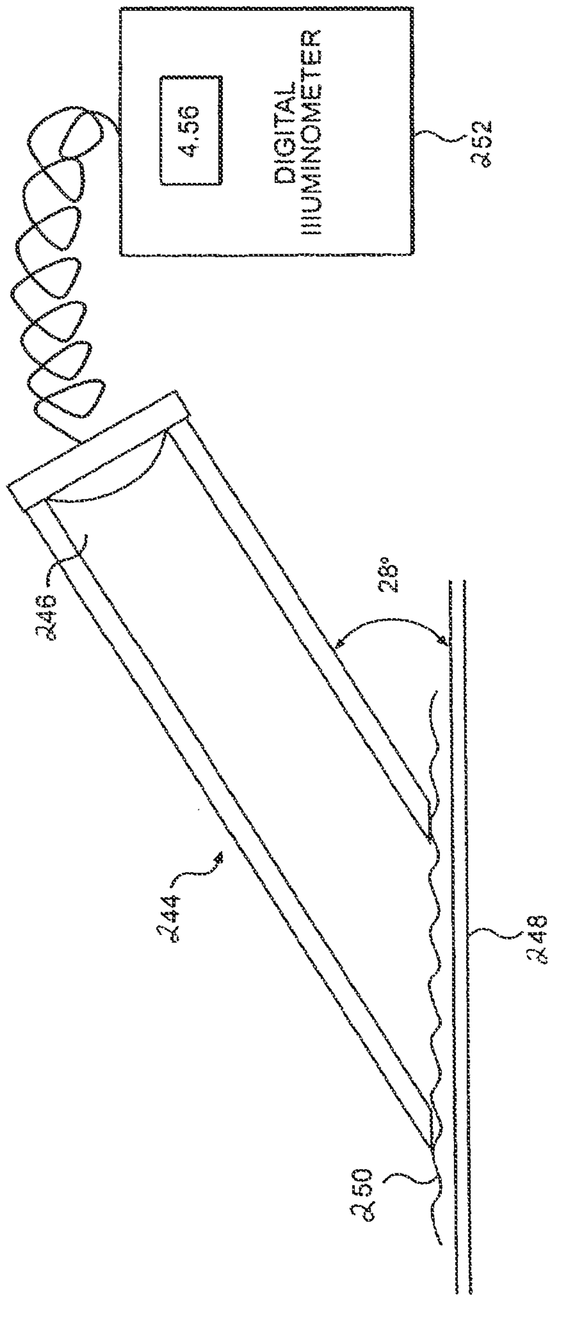
FIG. 35 depicts a transluminance test apparatus.

The transluminance test apparatus, as depicted in FIG. 35, consists of a piece of cylindrical tube 244 that is approximately 8.5" long and cut at a 28° angle. The inside surface of the tube is painted flat black to minimize the reflection noise in the readings. Light transmitted through the web itself, and not through a rupture, is an example of a non-target light source that could contribute to translucency noise which could lead non-perforate embossed webs to have transluminance ratios slightly exceeding about 1.0, but typically by no more than about 0.05 points. A detector 246, attached to the non-angled end of the pipe, measures the transluminance of the sample. A light table 248, having a translucent glass surface, is the light source.

The test is performed by placing the sample 250 in the desired orientation on the light table 248. The detector 246 is placed on top of the sample 250 with the long axis of the tube 244 aligned with the axis of the sample 250, either the machine direction or cross-machine direction, that is being measured and the reading on a digital illuminometer 252 is recorded. The sample 250 is turned 90° and the procedure is repeated. This is done two more times until all four views, two in the machine direction and two in the cross-machine direction, are measured. In order to reduce variability, all four measurements are taken on the same area of the sample 250 and the sample 250 is always placed in the same location on the light table 248. To evaluate the transluminance ratio, the two machine direction readings are summed and divided by the sum of the two cross-machine direction readings.

To illustrate the results achieved when perforate embossing with cross-machine direction elements as compared to machine direction elements, a variety of webs were tested according to the above-described transluminance test. The results of the test are shown in Table 3.

TABLE 3

Transluminance Ratios

| Basis Weight (lbs/ream) | Creping Method (Blade) | Emboss Alignment | Emboss Pattern | Trans-luminance Ratio |
|---|---|---|---|---|
| 30 | Undulatory | Full Step | CD Beveled Oval | 1.074 |
| 30 | Undulatory | Half Step | CD Beveled Oval | 1.056 |
| 32 | Undulatory | Half Step | CD Beveled Oval | 1.050 |
| 30 | Undulatory | Half Step | CD Oval | 1.047 |
| 31 | Undulatory | Half Step | CD Oval | 1.044 |
| 31 | Undulatory | Full Step | CD Oval | 1.043 |
| 30 | Undulatory | Full Step | CD Beveled Oval | 1.040 |
| 32 | Undulatory | Half Step | CD Beveled Oval | 1.033 |
| 30 | Undulatory | Half Step | CD Beveled Oval | 1.033 |
| 30 | Undulatory | Full Step | CD Oval | 1.027 |
| 32 | Undulatory | Half Step | CD Beveled Oval | 1.025 |
| 30 | Undulatory | Half Step | CD Oval | 1.022 |
| 31 | Undulatory | Full Step | CD Oval | 1.018 |
| 20 | Undulatory | Half Step | CD Beveled Oval | 1.015 |
| 30 | Undulatory | Half Step | CD Beveled Oval | 1.012 |
| 30 | Undulatory | Full Step | CD Beveled Oval | 1.006 |
| 28 | Standard | Unknown | MD Perforated | 1.000 |
| 24 | Undulatory | Half Step | MD Perforated | 0.988 |
| 22 | Standard | Unknown | MD Perforated | 0.980 |
| 29 | Undulatory | Half Step | MD Perforated | 0.966 |
| 29 | Undulatory | Half Step | MD Perforated | 0.951 |
| 31 | Undulatory | Half Step | MD Perforated | 0.942 |
| 29 | Undulatory | Half Step | MD Perforated | 0.925 |

A transluminance ratio of greater than 1.000 indicates that the majority of the perforations are in the cross-machine direction. For embossing rolls having cross-machine direction elements, the majority of the perforations are in the cross-machine direction. And, for the machine direction perforated webs, the majority of the perforations are in the machine direction. Thus, the transluminance ratio can provide a ready method of indicating the predominant orientation of the perforations in a web.

As noted above, perforated embossing in the cross-machine direction preserves cross-machine direction tensile strength. Thus, based on the desired end product, a web perforate embossed with a cross-machine direction pattern will exhibit one of the following when compared to the same base sheet embossed with a machine direction pattern: (a) a higher cross-machine direction tensile strength at equivalent finished product caliper, or (b) a higher caliper at equivalent finished product cross-machine direction tensile strength.

Dry tensile strengths (MD and CD) are measured with a standard Instron test device which may be configured in various ways, using 3-inch wide strips of tissue or towel, conditioned at 50% relative humidity and 23° C. (73.4° F.), with the tensile test run at a crosshead speed of 2 in/min. Tensile strengths are sometimes reported herein in breaking length (BL, km).

Following generally the procedure for dry tensile, wet tensile is measured by first drying the specimens at 100° C. or so and then applying a 1½ inch band of water across the width of the sample with a Payne Sponge Device prior to tensile measurement.

Alternatively, for testing the wet tensile strength, a Finch cup tester can be used. A Finch cup is a constant-rate-of-elongation tensile tester and is available from High-Tech Manufacturing Services, Inc., Vancouver, Wash.

Furthermore, the tensile ratio (a comparison of the machine direction tensile strength to the cross-machine direction tensile strength—MD strength/CD strength) of the cross-machine perforate embossed web typically will be at or below the tensile ratio of the base sheet, while the tensile ratio of the sheet embossed using prior art machine direction perforate embossing typically will be higher than that of the base sheet. These observations are illustrated by the following examples.

Higher cross-machine direction strength at equivalent caliper is demonstrated in Table 4. This table compares two products perforate embossed from the same base sheet—a 29 pounds per ream (lbs/R), undulatory blade-creped, conventional wet press (CWP) sheet.

TABLE 4

Increased CD Strength at Equivalent Caliper

| Emboss (perforate) | Basis Wt. (lbs/R) | Caliper (mils) | MD Dry Tensile (g/3") | CD Dry Tensile (g/3") | Dry Tensile Ratio (MD/CD) |
|---|---|---|---|---|---|
| CD Hexagonal | 29.1 | 144 | 3511 | 3039 | 1.16 |
| MD Hexagonal | 29.2 | 140 | 4362 | 1688 | 2.58 |

As shown in Table 4, the cross-machine direction perforate embossed web has approximately the same caliper as the machine direction perforate embossed web (144 vs. 140 mils, respectively), but its cross-machine direction dry tensile strength (3039 g/3") is considerably higher than that of the machine direction hexagonal-embossed web (1688 g/3"). In addition, compared to the tensile ratio of the base sheet (1.32), the cross-machine direction perforate embossed web has a lower ratio (1.16), while the machine direction perforate embossed web has a higher ratio (2.58). Thus the method of the present invention provides a convenient, low cost way of "squaring" the sheet—that is, bringing the tensile ratio closer to about 1.0.

Higher caliper at equivalent finished product cross-machine direction tensile strength is illustrated by three examples presented in Table 5. For each example a common base sheet (identified above each data set) was perforate embossed with a cross-machine direction and a machine direction oriented pattern (Hollow Diamond is a machine direction oriented perforate emboss).

TABLE 5

Increased Caliper at Equivalent CD Tensile Strength

| Emboss (perforate) | Basis Wt. (lbs/R) | Caliper (mils) | MD Dry Tensile (g/3") | CD Dry Tensile (g/3") | Dry Tensile Ratio (MD/CD) |
|---|---|---|---|---|---|
| Base Sheet--undulatory blade-creped, CWP base sheet with tensile ratio = 1.32 | | | | | |
| CD Quilt | 28.8 | 108 | 4773 | 4068 | 1.17 |
| MD Quilt | 28.8 | 78 | 6448 | 3880 | 1.66 |

TABLE 5-continued

| Increased Caliper at Equivalent CD Tensile Strength | | | | | |
|---|---|---|---|---|---|
| Emboss (perforate) | Basis Wt. (lbs/R) | Caliper (mils) | MD Dry Tensile (g/3") | CD Dry Tensile (g/3") | Dry Tensile Ratio (MD/CD) |
| Base Sheet--undulatory blade-creped, CWP base sheet with tensile ratio = 1.32 | | | | | |
| CD Quilt | 29.5 | 154 | 2902 | 2363 | 1.23 |
| MD Quilt | 29.5 | 120 | 5361 | 2410 | 2.22 |
| Base Sheet--undulatory blade-creped, CWP base sheet with tensile ratio = 1.94 | | | | | |
| CD Oval | 24.6 | 75 | 4805 | 2551 | 1.88 |
| Hollow Diamond | 24.1 | 56 | 5365 | 2364 | 2.27 |

In each case, the cross-machine direction perforate embossed product displays enhanced caliper at equivalent cross-machine direction dry tensile strength relative to its machine direction perforate embossed counterpart. Also, the cross-machine direction perforate embossed product has a lower tensile ratio, while the machine direction perforate embossed product a higher tensile ratio, when compared to the corresponding base sheet.

By employing cross-machine direction perforate embossing, the current invention further allows for a substantial reduction in base paper weight while maintaining the end product performance of a higher basis weight product. As shown below in Table 6, wherein the web is formed of recycled fibers, the lower basis weight cross-machine direction perforate embossed towels achieved similar results to machine direction perforate embossed toweling made with higher basis weights.

TABLE 6

| Performance Comparisons | Product ID | | | |
|---|---|---|---|---|
| | 20204 | 22#30C6 | 30.5#HD | 28#29C8 |
| Emboss | Hollow Diamond (MD Perforate) | CD Oval (CD Perforate) | Hollow Diamond (MD Perforate) | CD Oval (CD Perforate) |
| Basis Weight (Lbs/Ream) | 24.1 | 22.2 | 31.3 | 28.9 |
| Caliper | 56 | 62 | 76 | 81 |
| Dry MD Tensile (G/3") | 5365 | 5057 | 5751 | 4144 |
| Dry CD Tensile (G/3") | 2364 | 2391 | 3664 | 3254 |
| MD Stretch (%) | 7.6 | 8.1 | 8.8 | 10.1 |
| CD Stretch (%) | 6.3 | 6.1 | 5.5 | 5.3 |
| Wet MD Cured Tensile (G/3") | 1236 | 1418 | 1409 | 922 |
| Wet CD Cured Tensile (G/3") | 519 | 597 | 776 | 641 |
| Macbeth 3100 Brightness (%) | 72.3 | 72.6 | 73.3 | 73.4 |
| SAT Capacity (G/M$^2$) | 98 | 102 | 104 | 119 |
| Sintech Modulus | 215 | 163 | 232 | 162 |
| Bulk Density | 367 | 405 | 340 | 385 |
| Wet Resiliency (Ratio) | 0.735 | 0.725 | 0.714 | 0.674 |

In Table 6, two comparisons are shown. In the first comparison, a 24.1 lbs/ream machine direction perforated web is compared with a 22.2 lbs/ream cross-machine direction perforated web. Despite the basis weight difference of 1.9 lbs/ream, most of the web characteristics of the lower basis weight web are comparable to, if not better than, those of the higher basis weight web. For example, the caliper and the bulk density of the cross-machine direction perforated web are each about 10% higher than those of the machine direction perforated web. The wet and dry tensile strengths of the webs are comparable, while the Sintech modulus of the cross-machine direction perforated web (i.e., the tensile stiffness of the web, where a lower number may be preferred) is considerably less than that of the machine direction perforated web. In the second comparison, similar results are achieved in the sense that comparable tensile ratios and physicals can be obtained with a lower basis weight web. Paradoxically, consumer data indicates that the 28#29C8 product was rated equivalent to the 30.5#HD product while the 22#30C6 product was at statistical parity with the 20204 product, but was possibly slightly less preferred than the 20204 product.

Figure 12:
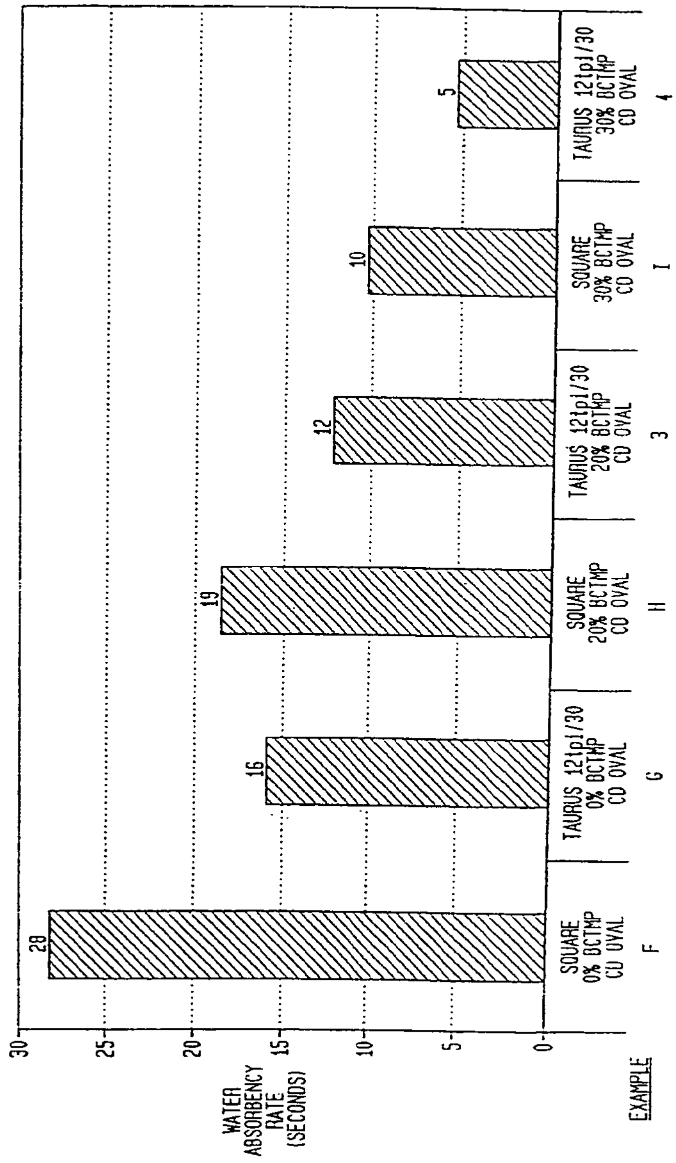
FIG. 12 is a bar graph illustrating the water absorbency rate for various wet-creped products.
Figure 13:
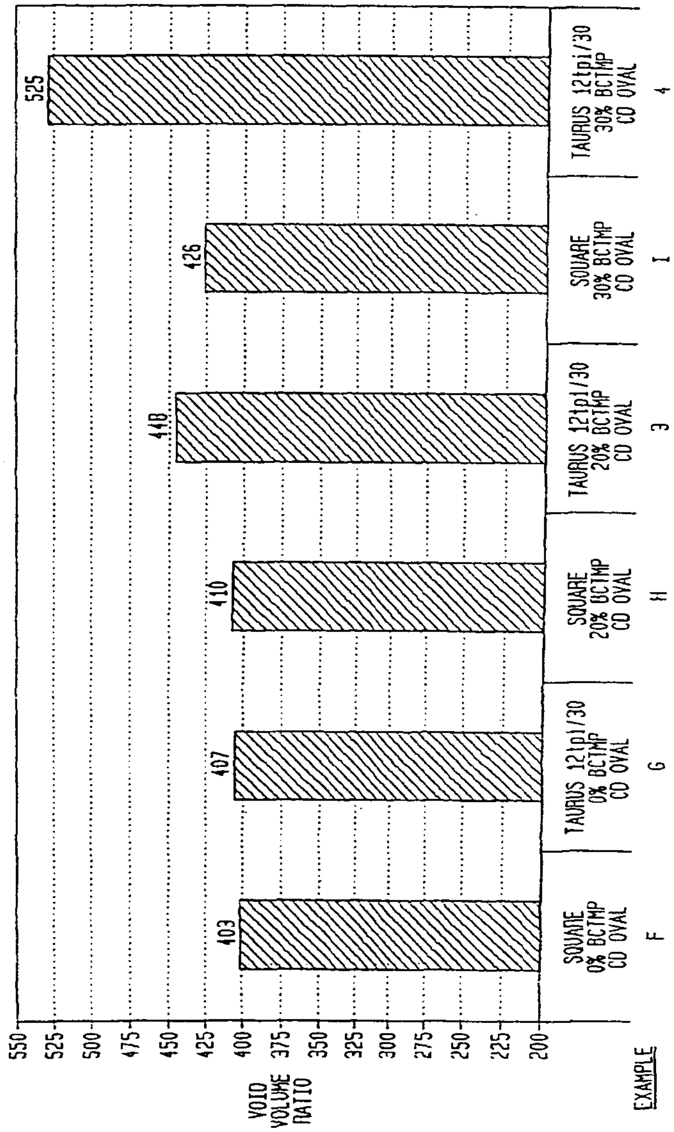
FIG. 13 is a bar graph illustrating the bulk density for various wet-creped products.

In one embodiment, a web formed of lignin-rich, high coarseness generally tubular fiber, such as BCTMP, is embossed with at least a cross-machine direction embossing pattern. A series of one-ply wet-creped towels were prepared using different creping blades and furnish compositions, including BCTMP. Specifically, the furnish composition was predominantly recycled fiber supplemented by various amounts of BCTMP as shown in Table 7. In each of the examples in Table 7 the amount of wet strength resin (in pounds/ton) was optimized and the basis weight was 28.0 lbs/ream. After the towel was manufactured, it was embossed with a cross-machine direction oval design, as indicated in FIGS. 18 A-D and described above. FIG. 12 is a bar graph illustrating water absorbency rate (WAR) for various compositions and methods of preparation. FIG. 13 is a bar graph showing void volume ratio of the various products.

TABLE 7

| Examples F-I and 3-4 (CD Oval Emboss Only) | Example F | Example G | Example H | Example 3 | Example I | Example 4 |
|---|---|---|---|---|---|---|
| Creping Blade | Square | 12 tpi/ 0.030" | Square | 12 tpi/ 0.030" | Square | 12 tpi/ 0.030" |
| BCTMP (%) | 0 | 0 | 20 | 20 | 30 | 30 |
| Recycled Fiber (%) | 100 | 100 | 80 | 80 | 70 | 70 |
| Carboxyl Methyl Cellulose | None | None | None | None | None | Yes |

The web consistency at the creping blade is between 60% to 85%.
*Carboxyl Methyl Cellulose.

It can be seen from FIGS. 12 and 13 that the CD perf embossed towels with BCTMP of the present invention exhibit a higher initial absorbency (lower WAR values in seconds) and higher bulk. Indeed, at a 30% BCTMP level, a product prepared with an undulating blade, 12 tpi and 30 mil tooth depth (Example 4), exhibited a water absorbency rate of twice that of a corresponding product prepared with a square blade (Example I).

The CD wet tensile strength of the product may be greater than about 500 g/3". In one embodiment, the CD wet tensile strength may be greater than about 700 g/3". The sheet may have a wet/dry CD tensile ratio of at least about 20%. In one embodiment, the wet/dry CD tensile ratio may be at least about 25%. In yet another embodiment, the wet/dry CD tensile ratio may be at least about 30%.

Following generally the procedures set forth above, a series of one-ply wet-creped towels were prepared and embossed as indicated in Table 8. The various properties of the towels were then measured.

TABLE 8

Embossed Towel Product Properties

| | Creping Blade | | | | | | |
|---|---|---|---|---|---|---|---|
| | STD Blade | 12tpi-0.030" | 12tpi-0.030" | 12tpi-0.030" | | 12tpi--0.030" | 8tpi--0.035" |
| | Furnish | | | | | | |
| | 67% SWD + 33% HWD | 80% SWD + 15% HWD | 70% Recycle | 67% SWD + 33% HWD | Comm. Available* Uncreped TAD Towel | 70% Recycle | 70% Recycle |
| BCTMP (%) | 0 | 5 | 30 | 0 | | 30 | 30 |
| Emboss Design | Diamond Rain Drop | Diamond Rain Drop | CD Oval | Diamond Rain Drop | None | MD Quilt | Hollow Diamond |
| Basis Weight (lbs/ream) | 27.7 | 27.1 | 28.0 | 27.3 | 22.8 | 28.5 | 28.2 |
| Caliper (mils/8 sheets) | 84.5 | 92.7 | 82.7 | 97.4 | 80.0 | 79.4 | 78.1 |
| Dry MD Tensile (g/3") | 5676 | 4776 | 4449 | 4878 | 3731 | 5016 | 4798 |
| Dry CD Tensile (g/3") | 2546 | 2689 | 3404 | 2827 | 3000 | 2852 | 3090 |
| GMT (g/3") | 3802 | 3584 | 3892 | 3713 | 3346 | 3782 | 3851 |
| MD Stretch (%) | 8.3 | 8.9 | 10.7 | 9.0 | 6.0 | 10.9 | 9.9 |
| CD Stretch (%) | 5.2 | 6.3 | 5.4 | 6.2 | 6.0 | 6.6 | 6.0 |
| Wet MD Cured Tensile (g/3") | 1584 | 1366 | 1539 | 1439 | 1100 | 1749 | 1547 |
| Wet CD Cured Tensile (g/3") | 635 | 716 | 1048 | 775 | 799 | 921 | 911 |
| CD Wet/Dry Ratio (%) | 24.9 | 26.6 | 30.8 | 27.4 | 26.6 | 32.3 | 29.5 |
| WAR (seconds) (TAPPI) | 17 | 10 | 5 | 13 | 4 | 6 | 7 |
| MacBeth 3100 Brightness (%) UV Excluded | 78.8 | 80.0 | 77.4 | 81.3 | 79.2 | 77.3 | 77.5 |
| SAT Capacity (g/m$^2$) | 151.2 | 173.0 | 210.8 | 164.6 | 216.0 | 196.0 | 206.8 |
| Sintech Modulus (g/%-in) | 152.6 | 117.1 | 146.7 | 109.2 | 149.4 | 119.0 | 158.8 |
| Void Volume Ratio (%) | 363.9 | 394.5 | 490.5 | 376.1 | 558.7 | 482.7 | 482.4 |

| | Creping Blade | | | | | | |
|---|---|---|---|---|---|---|---|
| | 12tpi--0.030" | Square Blade | | Square | Square | Square | 15% Bevel |
| | Furnish | | | | | | |
| | 70% Recycle | 100% Virgin Fiber | Comm. Available* CWP Towel | 100% Recycle | 100% Recycle | 60% Recycle | 67% SWD + 33% HWD |
| BCTMP (%) | 30 | | | 0 | 0 | 40 | 0 |
| Emboss Design | Hollow Diamond | 10M | MD Quilt | 10M | Hollow Diamond | Hollow Diamond | Diamond Rain Drop |
| Basis Weight (lbs/ream) | 27.9 | 24.6 | 28.3 | 32.1 | 31.2 | 28.5 | 25.0 |
| Caliper (mils/8 sheets) | 76.8 | 58.6 | 69.6 | 60.0 | 77.1 | 76.1 | 77.9 |
| Dry MD Tensile (g/3") | 4601 | 7019 | 5455 | 6320 | 5273 | 4683 | 6594 |
| Dry CD Tensile (g/3") | 3032 | 3063 | 2359 | 3467 | 3237 | 2812 | 3400 |
| GMT (g/3") | 3735 | 4637 | 3587 | 4681 | 4132 | 3692 | 4935 |
| MD Stretch (%) | 9.2 | 10.1 | 9.4 | 6.0 | 5.4 | 11.1 | 9.8 |
| CD Stretch (%) | 5.5 | 5.8 | 5.2 | 5.2 | 5.3 | 4.9 | 4.6 |
| Wet MD Cured Tensile (g/3") | 1309 | 1804 | 1780 | 1368 | 963 | 1586 | 2222 |

TABLE 8-continued

| Embossed Towel Product Properties | | | | | | | |
|---|---|---|---|---|---|---|---|
| Wet CD Cured Tensile (g/3") | 848 | 679 | 736 | 692 | 624 | 930 | 940 |
| CD Wet/Dry Ratio (%) | 28.0 | 22.2 | 31.2 | 19.9 | 19.3 | 33.1 | 27.6 |
| WAR (seconds) (TAPPI) | 5 | 14 | 22 | 29 | 18 | 3 | 35 |
| MacBeth 3100 Brightness (%) UV Excluded | 77.4 | 85.1 | 79.3 | 76.3 | 76.1 | 76.1 | 83.1 |
| SAT Capacity (g/m$^2$) | 205.5 | 143.7 | 173.9 | 130.8 | 163.3 | 214.7 | 127.6 |
| Sintech Modulus (g/%-in) | 165.2 | 189.5 | 229.1 | 221.8 | 239.6 | 131.2 | 191.3 |
| Void Volume Ratio (%) | 486.3 | 428.6 | 449.9 | 315.3 | 369.8 | 528.0 | 337.3 |

*"Comm. Available" indicates a commercially available towel.

The "void volume ratio," as referred to hereafter, is determined by saturating a sheet with a non-polar liquid and measuring the amount of liquid absorbed. The volume of liquid absorbed is equivalent to the void volume within the sheet structure. The percent weight increase (PWI) is expressed as grams of liquid absorbed per gram of fiber in the sheet structure times 100, as noted hereinafter. More specifically, for each single-ply sheet sample to be tested, a 1 inch by 1 inch square (1 inch in the machine direction and 1 inch in the cross-machine direction) is cut out of each of eight selected sheets. For multi-ply product samples, each ply is measured as a separate entity. Multiple samples should be separated into individual single plies and 8 sheets from each ply position used for testing. The dry weight of each test specimen is weighed and recorded to the nearest 0.0001 gram. The specimen is placed in a dish containing POROFIL™ liquid having a specific gravity of 1.875 grams per cubic centimeter, available from Coulter Electronics Ltd., Luton, England (Part No. 9902458). After 10 seconds, the specimen is grasped at the very edge (1-2 millimeters in) of one corner with tweezers and removed from the liquid. The specimen is held with that corner uppermost and excess liquid is allowed to drip for 30 seconds. The lower corner of the specimen is then lightly dabbed (less than ½ second contact) on #4 filter paper (Whatman Lt., Maidstone, England) in order to remove any excess of the last partial drop. The specimen is immediately weighed, i.e., within 10 seconds, and the weight recorded to the nearest 0.0001 gram. The PWI for each specimen, expressed as grams of POROFIL per gram of fiber, is calculated as follows:

$$PWI=[(W_2-W_1)/W_1]\times100\%$$

wherein

"$W_1$" is the dry weight of the specimen, in grams; and

"$W_2$" is the wet weight of the specimen, in grams.

The PWI for all eight individual specimens is determined as described above and the average of the eight specimens is the PWI for the sample.

The void volume ratio is calculated by dividing the PWI by 1.9 (density of fluid) to express the ratio as a percentage.

The water absorbency rate (WAR) of the sheet of the present invention may be at least about 10% less than that of an alike or equivalent sheet prepared without the use of an undulatory creping blade or at least about 10% less than that of an alike or equivalent sheet made without high coarseness, tubular fibers. These differences are particularly apparent from FIG. 10, as discussed previously. The water absorbency rate (WAR) of the paper product may be less than about 25 seconds. In one embodiment, the WAR may be less than about 15 seconds. The water absorbency rate of the paper product is measured in seconds and is the time it takes for a sample to absorb a 0.1 gram droplet of water disposed on its surface by way of an automated syringe. The test specimens may be conditioned at 23° C.±1° C. (73.4° F.±1.8° F.) at 50% relative humidity. For each sample, four 3×3 inch test specimens are prepared. Each specimen is placed in a sample holder such that a high intensity lamp is directed toward the specimen. 0.1 ml of water is deposited on the specimen surface and a stop watch is started. When the water is absorbed, as indicated by lack of further reflection of light from the drop, the stopwatch is stopped and the time recorded to the nearest 0.1 seconds. The procedure is repeated for each specimen and the results averaged for the sample.

Figure 14:
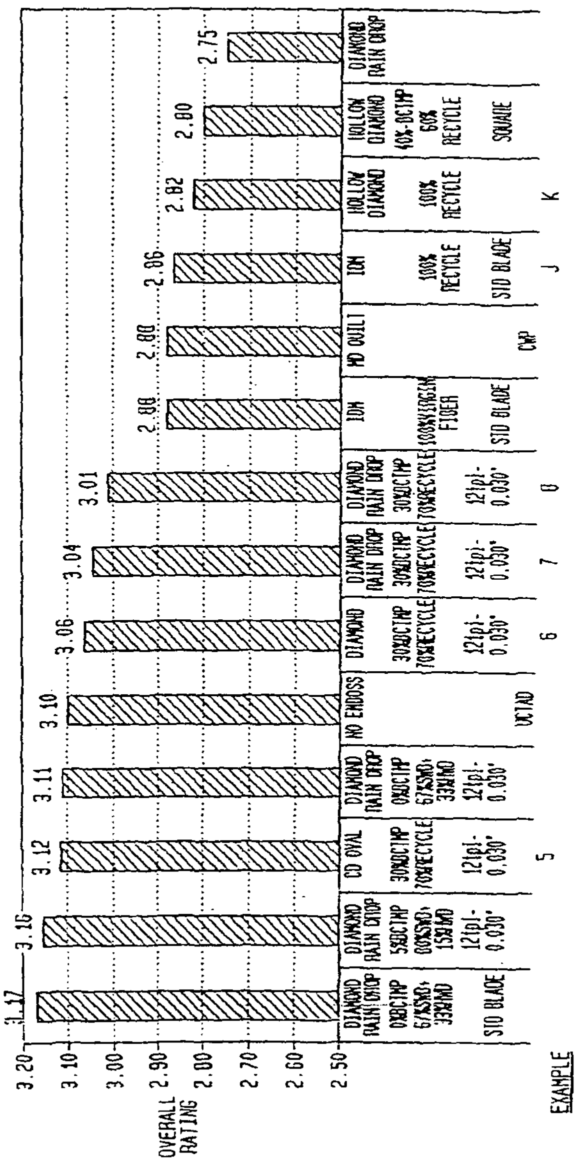
FIG. 14 is a bar graph illustrating overall consumer ratings for various products.

The towels described above and in Table 8 were submitted for consumer testing and given an overall rating. Testing was conducted by consumers who rated the products for drying hands, feel, overall appearance, thickness, strength when wet, absorbency, speed of absorbency, texture, ease of dispensing, being clothlike, softness, durability, among other factors. An overall rating was also assigned. Results for this test appear in FIG. 14.

Figure 15:
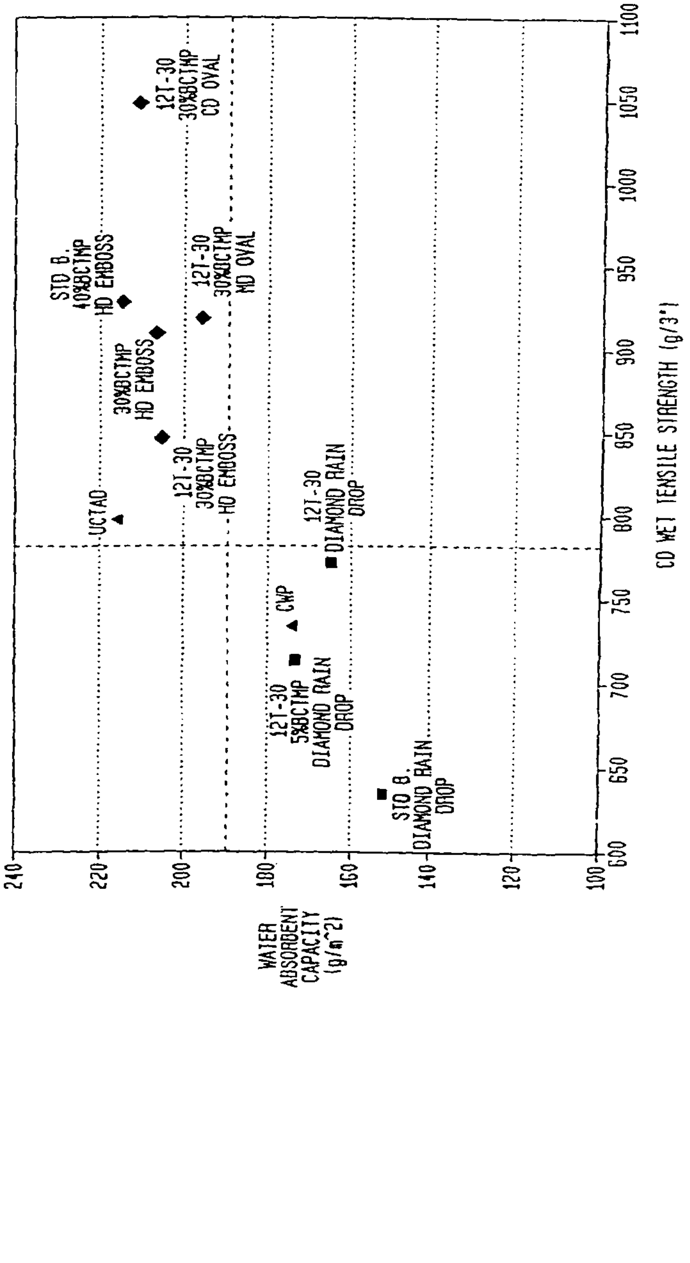
FIG. 15 is a plot of water absorbent capacity versus CD wet tensile strength for products of the invention and various existing products.

In FIG. 15, there is shown WAC values and CD wet tensile values of products of the invention as well as other products.

Figure 38:
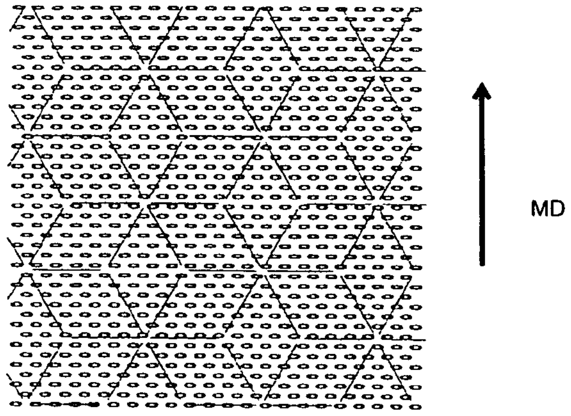
FIG. 38 illustrates embossing elements according to yet another embodiment of the present invention.

In one embodiment of the present invention, the web may be embossed with two embossing rolls, with at least one roll having both perforate embossing elements extending substantially in the cross-machine direction and elongated embossing elements extending substantially in the machine direction. For example, as shown in FIG. 36, the web may be embossed with a cube emboss pattern. In one embodiment, the perforate elements and elongated embossing elements may be on both embossing rolls. In another embodiment, the elongated machine direction embossing elements may be on a first embossing roll and the elongated cross-machine direction perforate embossing elements may be on a second embossing roll. In a further embodiment, the perforate elements and elongated elements may be on only one roll. The web may be embossed with the machine direction emboss pattern alone, or in combination with cross-machine direction embossing patterns. In one embodiment, as shown in FIG. 38, the web is embossed with elements substantially oriented in the cross-machine direction as described above, and further embossed with the cube emboss pattern. Moreover, the cube emboss pattern may also be employed with a web containing lignin-rich, high coarseness, generally tubular fibers and/or an undulatory creped web.

The cube emboss pattern depicted in FIGS. 36 and 38 is a generally three-dimensional perspective of a cube, where the cube's z-axis is oriented substantially parallel to the cross-machine direction of the web being embossed. The orthogonal geometry of the cube emboss pattern results in an apparent change in element shape when the embossed web is viewed or illuminated from different angles. Specifically, when the embossed web is viewed with omni-directional or machine direction illumination, as depicted in FIG. 36, the geometry observed is a cube. However, when the source of illumination is collinear with the cross-machine axis, the pattern appears as a diamond whose axis is oriented substantially along the machine direction, as shown in FIG. 37. Not being bound by theory, the change appears to result from the fact that the three vertical components of the cube are parallel to the illumination axis and, thus, do not contribute to the topography of the emboss design when the web is illuminated from the cross-machine direction.

In one embodiment, the elongated embossing elements may have a length of at least about 0.25". In another embodiment, the elongated elements may have a length of at least about 0.50". In one embodiment, the element engagement range with the web when cube embossing can be from about 18 mils to about 90 mils. In another embodiment, the element engagement range with the web when cube embossing can be from about 30 mils to about 80 mils. And in yet another embodiment, the element engagement range with the web when cube embossing can be from about 50 mils to about 70 mils.

As shown in the following tables, CWP paper towel products made with various combinations of cube embossing, cross-machine direction embossing, undulatory creping, and BCTMP are equivalent or superior to TAD paper towel products, regardless of whether virgin pulp or recycled fibers are used. Table 9 includes various combinations of cross-machine direction embossing, cube embossing, and undulatory creping. Table 10 adds the additional variable of a web containing lignin-rich, high coarseness, generally tubular fiber, specifically, BCTMP. In each table, the CWP paper towel products are compared to TAD paper products (samples G and H) and to a CWP product (sample F) not within the scope of the present invention.

TABLE 9

Effects of Combinations of Variables

| | Sample | | | | | | | |
|---|---|---|---|---|---|---|---|---|
| | A | B | C | D | E | F | G | H |
| Forming | CWP | CWP | CWP | CWP | TAD | CWP | TAD | TAD |
| CD Emboss | X | | | X | X | | | |
| Cube Emboss | X | X | X | X | X | | | |
| BCTMP | | | | | | | | |
| Undulatory Creping | X | X | | | | | | |
| Furnish | Virgin Pulp | Recycle Fiber | Recycle Fiber | Recycle Fiber | Virgin Pulp | 40% Recycle Fiber | Virgin Pulp | Virgin Pulp |
| Basis Weight (lbs/ream) | 30.7 | 31.6 | 33.8 | 32.8 | 26.4 | 31.7 | 26.6 | 26.9 |
| Caliper (mils/8 sheets) | 108 | 83 | 90 | 109 | 93 | 102 | 97 | 95 |
| Dry MD Tensile (g/3") | 5708 | 7382 | 8673 | 3985 | 4770 | 7478 | 4440 | 5101 |
| Dry CD Tensile (g/3") | 3721 | 4477 | 5227 | 3502 | 3156 | 2724 | 3099 | 2623 |
| Dry MD/CD Tensile Ratio | 1.53 | 1.65 | 1.66 | 1.34 | 1.51 | 2.75 | 1.43 | 1.94 |
| GMT | 4609 | 5749 | 6733 | 3736 | 3880 | 4512 | 3709 | 3640 |
| MD Stretch (%) | 10.9 | 8.7 | 10.0 | 8.4 | 7.1 | 10.5 | 13.4 | 7.7 |
| CD Stretch (%) | 6.1 | 4.4 | 4.4 | 4.8 | 4.5 | 9.1 | 7.7 | 5.8 |
| Finch Wet MD Cured Tensile (g/3") | 1625 | 1526 | 2195 | 877 | 1239 | 1997 | 1269 | 1387 |
| Finch Wet CD Cured Tensile (g/3") | 949 | 871 | 731 | 602 | 768 | 711 | 821 | 706 |
| Finch CD Wet/Dry Ratio (%) | 25.5 | 19.4 | 14.0 | 17.2 | 24.3 | 26.1 | 22.1 | 26.9 |
| WAR (seconds) (TAPPI) | 8.7 | 44.5 | 51.4 | 26.1 | 4.0 | 6.2 | 1.6 | 3.9 |
| MacBeth 3100 Brightness (%) UV Excluded | 82.7 | 85.2 | 84.3 | 84.8 | 96.3 | 81.3 | 81.1 | 83.6 |
| SAT Capacity ($g/m^2$) | 183 | 136 | 140 | 167 | 255 | N/A | 244 | 250 |
| SAT Rate ($g/sec^{0.5}$) | 0.023 | 0.008 | 0.011 | 0.014 | 0.051 | N/A | 0.071 | 0.056 |
| Sintech Modulus | 110 | 149 | 170 | 90.0 | 114 | 113 | 109 | N/A |
| Bulk Density Weight Increase (%) | 392 | 292 | 253 | 375 | 542 | 450 | 578 | 601 |

TABLE 10

Effects of Combinations of Variables

| | Sample | | | | | | |
|---|---|---|---|---|---|---|---|
| | I | J | K | L | F | G | H |
| Forming | CWP | CWP | CWP | CWP | CWP | TAD | TAD |
| CD Emboss | X | X | X | X | | | |
| Cube Emboss | X | | X | X | | | |
| BCTMP | X | X | X | X | | | |
| Undulatory Creping | X | X | X | | | | |
| Furnish | Virgin Pulp | Recycle Fiber | Recycle Fiber | Virgin Pulp | 40% Recycle Fiber | Virgin Pulp | Virgin Pulp |
| Basis Weight (lbs/ream) | 31.6 | 28.8 | 27.6 | 31.2 | 31.7 | 26.6 | 26.9 |
| Caliper (mils/8 sheets) | 92 | 82 | 115 | 100 | 102 | 97 | 95 |
| Dry MD Tensile (g/3") | 3769 | 3645 | 2828 | 5461 | 7478 | 4440 | 5101 |
| Dry CD Tensile (g/3") | 1588 | 3392 | 2314 | 2958 | 2724 | 3099 | 2623 |
| Dry MD/CD Tensile Ratio | 2.37 | 1.07 | 1.22 | 1.85 | 2.75 | 1.43 | 1.94 |
| GMT | 2444 | 3516 | 2558 | 4019 | 4512 | 3709 | 3640 |
| MD Stretch (%) | 7.2 | 7.5 | 7.1 | 9.3 | 10.5 | 13.4 | 7.7 |
| CD Stretch (%) | 4.0 | 4.9 | 4.3 | 5.1 | 9.1 | 7.7 | 5.8 |
| Finch Wet MD Cured Tensile (g/3") | 1250 | 935 | 1012 | 1665 | 1997 | 1269 | 1387 |
| Finch Wet CD Cured Tensile (g/3") | 509 | 798 | 613 | 905 | 711 | 821 | 706 |
| Finch CD Wet/Dry Ratio (%) | 32.1 | 23.5 | 26.5 | 30.6 | 26.1 | 22.1 | 26.9 |
| WAR (seconds) (TAPPI) | 5.2 | 7.9 | 14.5 | 7.0 | 6.2 | 1.6 | 3.9 |
| MacBeth 3100 Brightness (%) UV Excluded | 81.1 | 76.5 | 76.9 | 95.6 | 81.3 | 81.1 | 83.6 |
| SAT Capacity (g/m$^2$) | 261 | 209 | 201 | 261 | N/A | 244 | 250 |
| SAT Rate (g/sec$^{0.5}$) | 0.036 | 0.030 | 0.028 | .036 | N/A | 0.071 | 0.056 |
| Sintech Modulus | 104 | 151 | 87.0 | 101 | 113 | 109 | N/A |
| Bulk Density Weight Increase (%) | 486 | 489 | 510 | 504 | 450 | 578 | 601 |

In one embodiment of the present invention, the web may be both cube embossed and additionally embossed in substantially the cross-machine direction. Specifically, in one embodiment, a first roll and a second roll are provided, the first and second rolls defining a nip. At least one of the first and second rolls may include elongated embossing elements extending in substantially the machine direction, at least one of the first and second rolls may include elongated embossing elements extending in substantially the cross-machine direction, and at least one of the rolls may include substantially cross-machine direction embossing elements. The substantially cross-machine embossing elements may be perforate embossing elements. Those of ordinary skill in the art will readily appreciate that the various embossing elements may be provided on any of the embossing rolls in any combination.

As noted above, embossing only in the cross-machine direction reduces the machine direction tensile strength while maintaining the cross-machine direction tensile strength, as evidenced by the Dry MD/CD tensile ratios. Specifically, sample F, a CWP paper towel having no cross-machine direction embossing, has a dry MD/CD tensile ratio of approximately 2.75, while the cross-machine direction embossed samples in Tables 4 and 5 have dry MD/CD tensile ratios ranging from 1.16 to 1.88. When the paper towel is then cube embossed in the machine direction, the machine direction tensile strength is decreased less than the cross-machine direction strength. Likewise, when the paper towel is perforate embossed in the cross-machine direction, the cross-machine direction tensile strength is decreased less than the machine direction strength. Thus, the effect of combining the two emboss patterns is a machine direction to cross-machine direction tensile ratio that is comparable to that found in TAD towels. Specifically, samples B and C, above, have dry MD/CD tensile ratio of 1.53 and 1.34, respectively, while the TAD towels, samples G and H, have ratios of 1.43 and 1.94, respectively. Moreover, the effect of using the cube emboss alone is a paper towel product having dry MD/CD tensile ratios comparable to TAD towels. Specifically, samples C and D have dry MD/CD tensile ratios of 1.65 and 1.66, respectively. Not being bound by theory, it is believed this is the result of the cube emboss having a portion of its embossing elements oriented in the cross machine direction.

Because the perceived strength of a paper towel is often determined by the consumer when the towel is wet, the wet properties of a towel have an impact on the overall consumer acceptance of a product. Comparing samples A, B, and C with the TAD samples G and H, as well as with a traditional CWP towel, sample F, shows that the wet CD tensile of samples A, B, and C may approach or exceed that of the prior art TAD and CWP paper towels. Additionally, CD wet/dry ratio is an indication of the perceived softness and strength of the towel. Specifically, the higher the CD wet/dry ratio, the greater the perceived softness and strength. As indicated above, the CD wet/dry ratio of the paper towel sample A, having machine direction and cross-machine direction embossing and being creped with an undulatory blade, is generally equal to or greater than the ratios for the TAD paper towels and the prior art CWP paper towel. Finally, the Sintech modulus of the paper towels of the present invention (i.e., the tensile stiffness of the web, which relates to softness and where a lower number may be preferred) is generally equal to or less than that of the TAD and prior art CWP towels when the web is embossed in both the machine direction and cross-machine direction.

The addition of BCTMP to the pulp does not adversely affect the results discussed above. Regarding dry MD/CD ratio, sample J in Table 10, which was cross-machine direction embossed, but not cube embossed, had a ratio of 1.07. Additionally, samples I and K in Table 10, which were both cross-machine direction and cube embossed, each had dry MD/CD ratios lower than the commercially available CWP towel. And sample K in Table 10, which was formed from recycled fibers, had a dry MD/CD ratio that was lower than the TAD products. Moreover, the paper towel products of samples I and K achieved or exceeded the CD wet/dry ratio of the commercially available CWP towel, as well as the TAD products. As noted above, CD wet/dry ratio is an indication of the perceived softness and strength of the towel. Finally, the Sintech modulus of the paper towels of the present of samples I and K is less than that of the TAD and prior art CWP towels.

Consumer testing supports the physical data set forth above. Specifically, six paper towel products were tested in a consumer setting. Each selected consumer sampled five of the six towels and was asked to evaluate the towel overall, as well as on key attributes. Additionally, observational data on the number of towels used, tabbing, and dispensing was recorded by the observer. Table 11 presents the results of the data. Samples F and G in Table 11 are current commercial products.

TABLE 11

Results of Consumer Testing

| | Sample | | | | | |
|---|---|---|---|---|---|---|
| | A | E | F | G | H | L |
| Forming | CWP | TAD | TAD | TAD | CWP | CWP |
| CD Emboss | X | X | | | X | X |
| Cube Emboss | X | X | | | X | X |
| BCTMP | | | | | X (38%) | X (20%) |
| Undulatory Creping | X | | | | | |
| Furnish | Virgin Pulp | Virgin Pulp | Virgin Pulp | Virgin Pulp | Virgin Pulp | Virgin Pulp |
| Overall Rating | 3.25 | 3.42 | 3.65 | 3.65 | 3.51 | 3.29 |
| Drying Your Hands | 3.34 | 3.63 | 3.89 | 3.80 | 3.61 | 3.50 |
| Overall Appearance | 3.30 | 3.49 | 3.50 | 3.48 | 3.54 | 3.43 |
| Feels In Your Hands | 2.84 | 3.32 | 3.56 | 3.32 | 3.26 | 3.06 |
| Softness | 2.84 | 3.17 | 3.38 | 3.43 | 3.29 | 3.06 |
| Texture | 2.89 | 3.28 | 3.31 | 3.24 | 3.31 | 3.05 |
| The Amount It Absorbs | 3.17 | 3.48 | 3.72 | 3.53 | 3.46 | 3.27 |
| Thickness | 3.01 | 3.22 | 3.62 | 3.49 | 3.28 | 3.11 |
| Being Clothlike | 2.62 | 3.15 | 3.32 | 3.12 | 3.14 | 2.82 |
| Speed of Absorbency | 3.23 | 3.34 | 3.70 | 3.48 | 3.37 | 3.20 |
| Strength When Wet | 3.33 | 3.39 | 3.73 | 3.49 | 3.42 | 3.39 |
| Ease of Dispensing | 3.61 | 3.79 | 3.68 | 3.87 | 3.74 | 3.69 |
| Not Shredding/Falling Apart During Use | 3.39 | 3.59 | 3.75 | 3.65 | 3.48 | 3.48 |
| Whiteness of Color | 3.70 | 3.69 | 3.85 | 3.84 | 3.77 | 3.60 |
| Size of Individual Towel | 3.46 | 3.52 | 3.35 | 3.64 | 3.59 | 3.45 |

Based on the consumer tests, sample H in Table 11, a CWP paper towel having both cross-machine directional and cube embossing and 38% BCTMP, was comparable overall to the two current commercial products against which it was compared. Not only was the overall rating for the towel comparable, but the ratings on other characteristics, such as drying hands, appearance, hand feel, softness, and texture, were also comparable. Moreover, sample E, a TAD paper towel having both cross-machine directional and cube embossing, also compared overall to the current commercial products. As with sample H, not only was the overall rating comparable, but also the ratings of the characteristics noted above.

Figure 7:
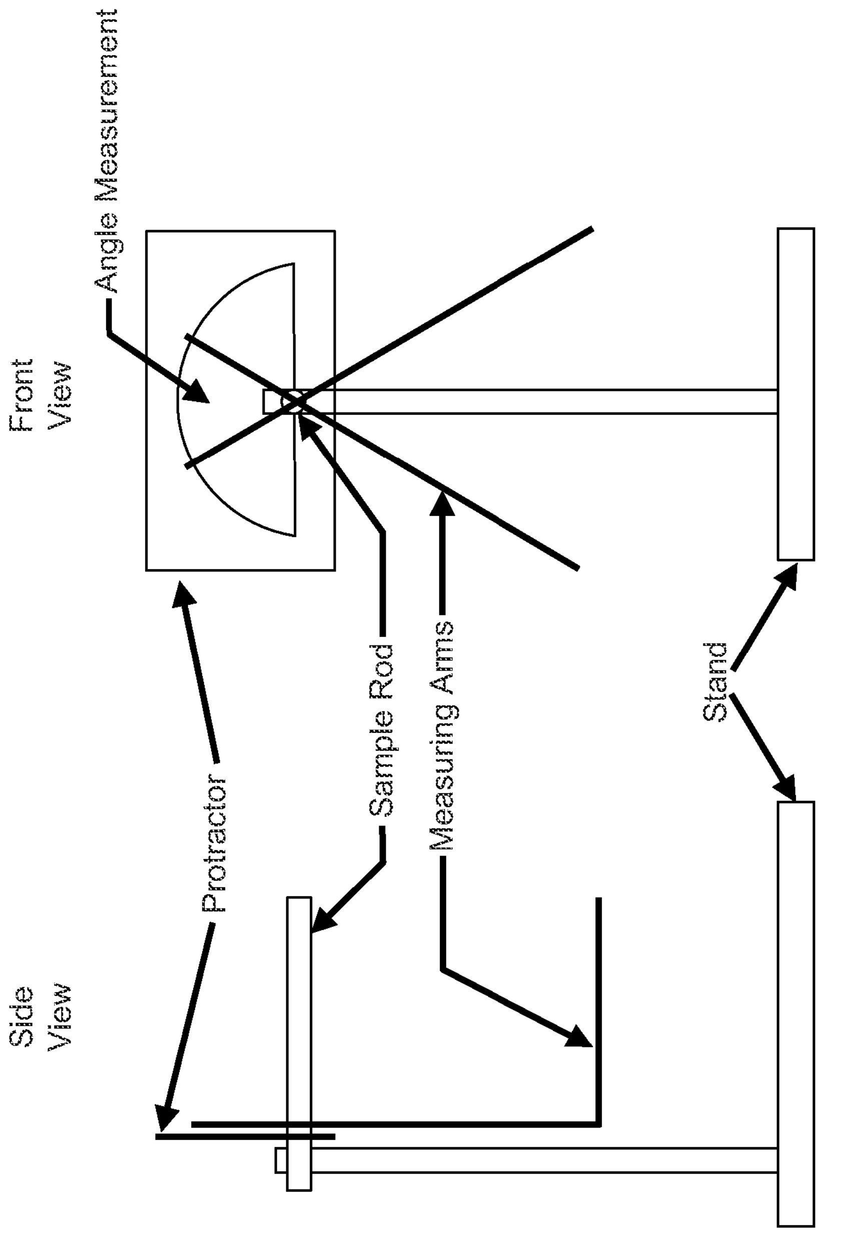
FIG. 7 depicts a drape angle test apparatus.

The combination of cube embossing and cross-machine direction embossing of a web also results in a CWP product having equivalent or superior softness as compared to a TAD product, as evidenced by an increased drape angle of the cube embossed/cross-machine direction embossed product. Drape angle, as used herein, is the angle of the non-supported portions of a web as the web rests on a rod. An exemplary drape angle measurement tester is depicted in FIG. 7. As shown, the drape angle measurement tester is a stand, having a rod extending perpendicularly to the stand. A protractor, or other angle measurement device, is mounted on the rod, such that the base measuring point of the protractor is located at the proximal end of the rod. L-shaped measuring arms are pivotally mounted on the rod, such that the pivot point of each of the arms is located at the rod. An upper portion of each of the arms extends to the angle measurement readings of the protractor. The lower portion of each of the arms is L-shaped, such that the lower leg of the L extends in the same direction as the rod. In use, a web is placed on the rod, such that the center portion of the web rests on the rod. The non-supported portions of the web will then drape downwardly due to gravitational forces. Once the web is at rest, the measuring arms are moved outwardly until the lower leg of the L-shaped portion contacts the web. The angle between the two measuring arms is then recorded.

In the drape test, four different paper towel products were tested. Additionally, for each of the products, two different test comparisons were made. In the first test, the towels were cut such that the weights of the towels were similar. In the second test, the dimensions of the tested towels were identical. The results are shown in Tables 12 and 13, respectively.

TABLE 12

Drape Test with Similar Towel Weight

| Sample | Forming Process | Furnish | Basis Weight | Crepe | Emboss | Average Sample Weight (g) | Average Sample Size | Average Drape |
|---|---|---|---|---|---|---|---|---|
| A | TAD | Virgin/ SWK | 28 | No | MD Quilt | 0.726 | 3" × 9" | 60 |
| B | CWP | Virgin/ BCTMP | 32 | Undulatory | CD + Cube | 0.750 | 2.5" × 9" | 50 |
| C | CWP | Virgin | 32 | Undulatory | CD + Cube | 0.718 | 2.5" × 9" | 71 |
| D | CWP | Virgin/ BCTMP | 32 | No | CD + Cube | 0.739 | 2.5" × 9" | 69 |

TABLE 13

Drape Test with Similar Towel Dimensions

| Sample | Forming Process | Furnish | Basis Weight | Crepe | Emboss | Average Sample Weight (g) | Average Sample Size | Average Drape |
|---|---|---|---|---|---|---|---|---|
| A | TAD | Virgin/ SWK | 28 | No | MD Quilt | 0.755 | 3" × 9" | 59 |
| B | CWP | Virgin/ BCTMP | 32 | Undulatory | CD + Cube | 0.922 | 3" × 9" | 50 |
| C | CWP | Virgin | 32 | Undulatory | CD + Cube | 0.867 | 3" × 9" | 68 |
| D | CWP | Virgin/ BCTMP | 32 | No | CD + Cube | 0.888 | 3" × 9" | 59 |

The results of the test indicate unexpected softness in paper formed by CWP methods when the towel is embossed with cross-machine direction embossing and cube emboss. Specifically, sample B, which contained 38% BCTMP, was creped with an undulatory creping blade, and then cross-machine direction and cube embossed, had a substantially lower drape angle than the TAD product and, hence, was substantially softer than the TAD product. Moreover, the uncreped CWP towel exhibited similar draping characteristics as the TAD towel when similar sized sample portions were used.

The towels of the present invention may be folded, unfolded, or rolled. Moreover, a folded towel may be folded longitudinally, i.e., in the machine direction, or transversely, i.e., in the cross-machine direction, or folded both longitudinally and transversely. In one embodiment of the present invention, the paper towel is folded using a conventional automated folder. Suitable folders are manufactured by G. C. Bretting Manufacturing Co. and are also described in U.S. Pat. Nos. 6,547,909, 6,539,829, 6,508,153, 6,488,194, 6,431,038, 6,372,064, 6,322,315, 6,296,601, 6,254,522, 6,227,086, 6,138,543, 6,051,095, 6,000,657, 5,941,144, 5,820,064, 5,772,149, 5,755,146, 5,643,398, 5,584,443, 5,299,793, 6,226,611, 4,997,338, 4,917,665, 4,874,158, 4,778,441, 4,770,402, 4,765,604, 4,751,807, 4,475,730, 4,270,744, 4,254,947, and 3,709,077, each of which is incorporated herein by reference in its entirety.

While the invention has been described in connection with numerous examples, modifications thereto within the spirit and scope of the present invention will be readily apparent to those of skill in the art.

What is claimed is:

1. An embossing roll including substantially machine direction elongated embossing elements, substantially cross-machine direction elongated embossing elements, and embossing elements for embossing and perforating the web, wherein at least a portion of the embossing elements for embossing and perforating the web are substantially oriented in the cross-machine direction, and wherein the elongated embossing elements provide a pattern which has a primary axis oriented substantially in the machine direction.

* * * * *